US008386300B2

(12) United States Patent
April et al.

(10) Patent No.: US 8,386,300 B2
(45) Date of Patent: Feb. 26, 2013

(54) STRATEGIC WORKFORCE PLANNING MODEL

(75) Inventors: Jay April, Denver, CO (US); Marco Better, Boulder, CO (US); Candace Brinkman, Boulder, CO (US); James P. Kelly, Boulder, CO (US); Terry Wubbena, Boulder, CO (US)

(73) Assignee: Optimization Technologies, Inc., Boulder, CO (US)

( * ) Notice: Subject to any disclaimer, the term of this patent is extended or adjusted under 35 U.S.C. 154(b) by 249 days.

(21) Appl. No.: 12/819,392

(22) Filed: Jun. 21, 2010

(65) Prior Publication Data

US 2011/0015958 A1 Jan. 20, 2011

Related U.S. Application Data

(60) Provisional application No. 61/218,807, filed on Jun. 19, 2009.

(51) Int. Cl.
*G06Q 10/00* (2012.01)
*G06Q 40/00* (2012.01)

(52) U.S. Cl. ..................... 705/7.36; 705/7.28

(58) Field of Classification Search .......... 705/7.36, 705/7.28
See application file for complete search history.

(56) References Cited

U.S. PATENT DOCUMENTS

| 2003/0004783 | A1* | 1/2003 | Calderaro et al. ............... 705/10 |
| 2004/0162748 | A1* | 8/2004 | Vogel et al. ..................... 705/8 |
| 2004/0162753 | A1* | 8/2004 | Vogel et al. ..................... 705/10 |
| 2006/0184484 | A1* | 8/2006 | Al-Otaibi et al. ............... 706/45 |
| 2006/0247900 | A1* | 11/2006 | Brocklebank ................. 702/189 |
| 2008/0103868 | A1* | 5/2008 | Santos et al. ...................... 705/9 |
| 2011/0208557 | A1* | 8/2011 | Gonzalez Diaz et al. .... 705/7.14 |

OTHER PUBLICATIONS

Flaherty, Collen N.; "The Effect of Tuition Reimbursement on Turnover: A Case Study Analysis". Mar. 2007. National Bureau of Economic Research. Initially presented Sep. 29-30, 2006.*
"Workforce Planning Instruction Manual". Aug. 2001. US Department of the Interior. Office of Personnel Policy.*
"Strategic Workforce Planning". Aug. 2003. Fairfax County Virginia.*
"Attraction and Retention: The Impact and Prevalence of Work-Life & Benefit Programs". Oct. 2007. WorldatWork.*
Hui-Yu, Chiang. "The Effect of Work-Life Balance Policies on Women Employees Turnover". Apr. 16, 2008. Osaka School of International Public Policy, Osaka University.*
Pattie, Marshall; Benson, George S.; Baruch, Yehuda. "Tuition Reimbursement, Pereceived Organizational Support, and Turnover Intention Among Graduate Business School Students". Winter 2006. Human Resource Development Quarterly. vol. 17. No. 4.*
allen, David G.; "Retaining Talent: A Guide to Analyzing and Managing Employee Turnover". 2008. SHRM Foundation.*
Dockel, Andreas; "The Effect of Retention Factors on Organisational Commitment: An Investigation of High Technology Employees". Jan. 2003. Faculty of Economics and Management Sciences—University of Pretoria.*
Riley, Bridget K.; "Employee Retnetion: An Empirical Study of Direct Care Employees at ACHIEVE". Apr. 29, 2009. Binghamton University.*

* cited by examiner

*Primary Examiner* — Peter Choi
(74) *Attorney, Agent, or Firm* — Holland & Hart LLP

(57) ABSTRACT

Systems, devices, and methods are provided for workforce planning models. Technologies are described to manage human capital decisions. Decision making models and related tools are described that support the development and implementation of workforce strategies, programs and policies. In one model, resources may be allocated to specific practices (policies, programs, initiatives, organizational culture) used to attract and retain valued employees. Resources may be increased or decreased until the optimal allocation of resources is found that is most likely to enable the achievement of specific goals (e.g., attraction, retention, readiness, and representation).

21 Claims, 19 Drawing Sheets

| Job Category | Job Requirements ||||| Assignment Value | Avg. Annual Salary | Quantity Required |||||
|---|---|---|---|---|---|---|---|---|---|---|---|---|
| | Job Level (Progression) | Job Type (Skills) | Tenure (Yrs) | Education | | | | Period 1 | Period 2 | Period 3 | Period 4 | Period 5 |
| SrProjectManager | Middle Management | Technical | 5 - 10 | Masters | | 15 | 90,000 | 32 | 33 | 34 | 33 | 32 |
| JrProjectManager | Non-managerial | Technical | 0 - 4 | Bachelors | | 8 | 60,000 | 79 | 82 | 85 | 83 | 81 |
| SrCivilEngineer | Middle Management | Civil | > 5 | Masters | | 15 | 75,000 | 32 | 33 | 34 | 33 | 32 |
| SrConstrEngineer | Middle Management | Construction | > 5 | Masters | | 15 | 70,000 | 32 | 33 | 34 | 33 | 32 |
| SrEnvEngineer | Middle Management | Environmental | > 5 | Masters | | 15 | 85,000 | 32 | 33 | 34 | 33 | 32 |
| SrMechEngineer | Middle Management | Mechanical | > 5 | Masters | | 15 | 80,000 | 32 | 33 | 34 | 33 | 32 |
| SrProcessEngineer | Middle Management | Process | > 5 | Masters | | 15 | 75,000 | 32 | 33 | 34 | 33 | 32 |
| SrElecEngineer | Middle Management | Electrical | > 5 | Masters | | 15 | 85,000 | 32 | 33 | 34 | 33 | 32 |
| JrCivilEngineer | Non-managerial | Civil | 0 - 10 | Bachelors | | 9 | 48,000 | 63 | 65 | 67 | 65 | 63 |
| JrConstrEngineer | Non-managerial | Construction | 0 - 10 | Bachelors | | 9 | 45,000 | 53 | 55 | 57 | 55 | 53 |
| JrEnvEngineer | Non-managerial | Environmental | 0 - 10 | Bachelors | | 9 | 48,000 | 58 | 60 | 62 | 60 | 58 |
| JrMechEngineer | Non-managerial | Mechanical | 0 - 10 | Bachelors | | 9 | 50,000 | 68 | 70 | 72 | 70 | 68 |
| JrProcessEngineer | Non-managerial | Process | 0 - 10 | Bachelors | | 9 | 50,000 | 42 | 43 | 44 | 43 | 42 |
| JrElecEngineer | Non-managerial | Electrical | 0 - 10 | Bachelors | | 9 | 60,000 | 42 | 43 | 44 | 43 | 42 |
| Technologist | Non-managerial | Technical | > 0 | Bachelors | | 1 | 65,000 | 31 | 32 | 33 | 32 | 31 |
| Technician | Non-managerial | Technical | 0 - 10 | Bachelors | | 1 | 45,000 | 31 | 32 | 33 | 32 | 31 |
| SrScientist | Middle Management | Technical | > 5 | PhD | | 12 | 85,000 | 21 | 21 | 21 | 20 | 19 |
| JrScientist | Non-managerial | Technical | 0 - 4 | Masters | | 6 | 65,000 | 5 | 5 | 5 | 4 | 3 |

FIG. 4

| Promotion Advancement | | | | |
|---|---|---|---|---|
| Tenure | Job level | Performance rating | Personality type | Probability |
| <5 | Non-managerial | Above | Pro-active | 0.1 |
| <5 | Middle Management | Above | Pro-active | 0.2 |
| 6-15 | Non-managerial | Average | Pro-active | 0.1 |
| 6-15 | Non-managerial | Above | Contributor | 0.25 |
| 6-15 | Non-managerial | Above | Pro-active | 0.25 |
| 6-15 | Middle Management | Average | Contributor | 0.2 |
| 6-15 | Middle Management | Average | Pro-active | 0.3 |
| 6-15 | Middle Management | Above | Contributor | 0.3 |
| 6-15 | Middle Management | Above | Pro-active | 0.3 |
| >15 | Non-managerial | Average | Contributor | 0.1 |
| >15 | Non-managerial | Average | Pro-active | 0.25 |
| >15 | Non-managerial | Above | Contributor | 0.25 |
| >15 | Non-managerial | Above | Pro-active | 0.5 |
| >15 | Middle Management | Average | Contributor | 0.2 |
| >15 | Middle Management | Average | Pro-active | 0.4 |
| >15 | Middle Management | Above | Contributor | 0.3 |
| >15 | Middle Management | Above | Pro-active | 0.5 |

| | Education Program | | Flexible Workplace | | | Healthcare | | Retirement | | Etc |
|---|---|---|---|---|---|---|---|---|---|---|
| Program/ Driver | No Tuition | 50% Tuition | No Flexibility | Flexible Start Time | Telecom- muting | HMO Plan | A La Carte Options | 401 K | 40K w/matching | Etc |
| Base Pay | | | | | | | | | | — |
| Healthcare Plan | | | | | | X | X | X | | — |
| Career Development | X | X | | | | | | | | — |
| Work/Life Balance | X | X | X | X | X | | | | | — |
| Manager Quality | | | | | | | | | | — |
| Company Reputation | | | | | | | | | | — |
| Pay for Performance | | | | | | | | | | — |
| Retirement Plan | X | | X | X | X | | | X | X | — |
| Company Culture | X | X | | X | | | | X | X | — |

FIG. 10

| Program/Attribute | Attribute Values | Education Program |  | Flexible Workplace |  |  | Healthcare |  | Retirement |  | Etc |
|---|---|---|---|---|---|---|---|---|---|---|---|
|  |  | No Tuition | 50% Tuition | None | Flex Start | Telecommuting | HMO Plan | A La Care Options | 401K | 401K w/ matching |  |
| Ethnicity | White |  |  |  |  |  |  |  |  |  | ... |
|  | Minty |  |  |  |  |  |  |  |  |  | ... |
|  | Asian |  |  |  |  |  |  |  |  |  | ... |
| Gender | M | -1 |  | -1 |  |  |  |  |  |  | ... |
|  | F | -3 | 1 | -3 |  |  |  |  |  |  | ... |
| Age | GenY | -3 | 3 | -1 | 1 | 3 |  |  |  |  | ... |
|  | GenX | -1 | 1 |  | 3 | 3 |  |  |  |  | ... |
|  | Boom |  |  |  | 1 | 1 | -1 | 1 | -1 | 1 | ... |
| Tenure | Short | -3 | 3 |  |  |  | -1 | 3 | -1 | 3 | ... |
|  | Mid | -1 | 1 |  |  |  |  | 1 |  | 3 | ... |
|  | Long |  |  |  |  |  |  |  |  |  | ... |
| Job Level | Empl | -1 | 3 | -3 | 1 | 3 | -1 | 3 | -1 | 3 | ... |
|  | MidMgt | -1 | 1 | -1 | 1 | 3 | -3 | 3 |  | 1 | ... |
|  | Exec |  | 1 |  |  |  | -1 | 1 | -1 | 1 | ... |
| Perf | Avg |  |  |  |  |  |  |  |  |  | ... |
|  | Below |  |  | -3 | 1 | 3 | -1 | 3 |  | 1 | ... |
|  | Above | -1 | 3 |  | 1 | 1 |  | 1 |  | 1 | ... |
| Depdts? | Y |  |  |  |  |  |  |  |  |  | ... |
|  | N |  |  |  |  |  |  |  |  |  | ... |
| Pers. Type | Contrib |  |  |  |  |  |  |  |  |  | ... |
|  | Vision |  |  |  |  |  |  |  |  |  | ... |

FIG. 12

| Program/Attribute | | Education Program | | | Flexible Workplace | | | Healthcare | | | Retirement | | Etc |
|---|---|---|---|---|---|---|---|---|---|---|---|---|---|
| | | No Tuition | 50% Tuition | | None | Flexible Start Time | Telecom- muting | | HMO Plan | A La Carte Options | | 401K | 401K w/ matching | Etc |
| Ethnicity | White | | | | | | | | | | | | | ... |
| Gender | Female | -1 | 1 | | -3 | 3 | 3 | | | | | | | |
| Age | GenX | -1 | 1 | | | | 1 | | | 1 | | -1 | 3 | |
| Tenure | Mid | -1 | 1 | | | | | | | -1 | 1 | -1 | 3 | |
| Job Level | MidMgmt | -1 | 1 | | -1 | 1 | 3 | | | -1 | 1 | 1 | | ... |
| Perf | Average | | | | | | | | | -1 | 3 | | | |
| Depdts? | Yes | | | | -3 | 1 | 3 | | | -1 | 3 | | | ... |
| Personality | Visionary | | | | | | | | | | | | | |
| | Min | -1 | 0 | | -3 | 0 | 0 | | | -1 | 0 | -1 | 0 | |
| | Max | 0 | 1 | | 0 | 3 | 3 | | | 0 | 3 | 0 | 3 | |
| | Final Score | -1 | 1 | | -3 | 3 | 3 | | | -1 | 3 | -1 | 3 | |

FIG. 13

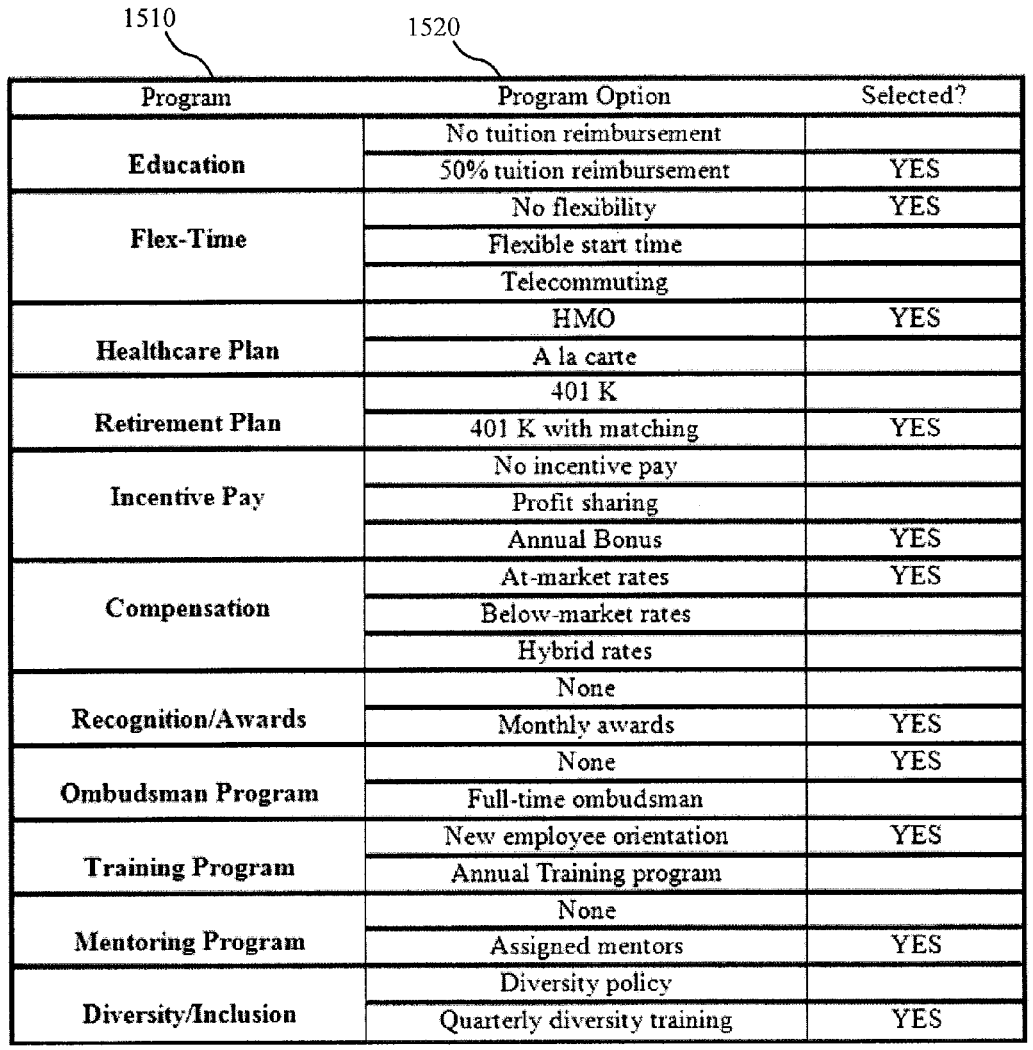

| Program | Program Option | Selected? |
|---|---|---|
| Education | No tuition reimbursement | |
| | 50% tuition reimbursement | YES |
| Flex-Time | No flexibility | YES |
| | Flexible start time | |
| | Telecommuting | |
| Healthcare Plan | HMO | YES |
| | A la carte | |
| Retirement Plan | 401 K | |
| | 401 K with matching | YES |
| Incentive Pay | No incentive pay | |
| | Profit sharing | |
| | Annual Bonus | YES |
| Compensation | At-market rates | YES |
| | Below-market rates | |
| | Hybrid rates | |
| Recognition/Awards | None | |
| | Monthly awards | YES |
| Ombudsman Program | None | YES |
| | Full-time ombudsman | |
| Training Program | New employee orientation | YES |
| | Annual Training program | |
| Mentoring Program | None | |
| | Assigned mentors | YES |
| Diversity/Inclusion | Diversity policy | |
| | Quarterly diversity training | YES |

FIG. 15

STRATEGIC WORKFORCE PLANNING MODEL

CROSS-REFERENCES TO RELATED APPLICATIONS

This application is a non-provisional patent application claiming priority benefit of U.S. provisional patent application Ser. No. 61/218,807, filed on Jun. 19, 2009 and entitled "Strategic Workforce Planning Model," the entire disclosure of which is herein incorporated by reference for all purposes.

BACKGROUND

The present invention relates to novel modeling techniques in general and, in particular, to workforce planning techniques.

Business leaders consistently identify "attracting, retaining, and developing talent" as a priority, as well as a top business challenge for the future. They recognize that success often depends on having the right people, in the right place, at the right time, and for the right cost. The ability to anticipate and rapidly respond to changing workforce needs, and to allocate resources to meet those needs, takes on increased importance in the dynamic economy of today.

While talent is a top priority, many organizations find it challenging to manage their workforce as strategically as they do their financial and physical assets or their customer requirements. The pace of change within economies, industries, and organizations continues to accelerate, while labor markets continue to become more competitive and more global, and the workforce continues to become more diverse in terms of its demographics, expectations, and goals. There is, therefore, a need in the art for novel models and tools to allow human capital recommendations and decisions to be made based on data and analytics, instead of relying on anecdotes and assumptions.

SUMMARY

Methods, systems, and devices are described for advanced workforce planning and management tools. Tools are described to forecast human capital requirements (numbers, skill sets, locations, timing) given a range of possible business scenarios, and respond in real-time to changes in the assumptions behind those scenarios. The impact of various human resource (HR) programs and practices on the attraction and retention of employees may be forecast. These impacts may vary based on demographics, job level, and performance. The impact of turnover and movement may be modeled, and the tradeoff between readiness (the ability of an organization to staff its labor requirements in a timely manner) and cost may be assessed.

In some embodiments, a method of workforce planning for an organization is provided. The method may include identifying multiple employee attributes. Selected attributes of the multiple employee attributes may be associated with each employee from the multiple employees of the organization. The method may also identify multiple practices of the organization. Each of the multiple practices of the organization may be associated with one or more impact factors. Each respective impact factor may represent an impact of the respective practice on employees based on their associated attributes. Multiple retention probabilities may be calculated. Each retention probability may represent a probability that one or more of the multiple employees will remain employed during a time period at the organization based on the impact factors associated with respective employees.

Some embodiments of the method of workforce planning for an organization may include simulating a workforce composition for the organization utilizing the multiple retention probabilities for multiple time periods. Some embodiments of the method of workforce planning for an organization may include optimizing selection of a subset of the multiple practices for the organization based at least in part on the calculated retention probabilities.

In some embodiments, a system for workforce planning for an organization is provided. The system may include one or more storage mediums. The system may include an employee attribute module communicatively coupled with at least one of the one or more storage mediums. The employee attribute module may be configured to identify multiple employee attributes. The employee attribute module may be configured to associate selected attributes of the multiple employee attributes with each employee from multiple employees of the organization. The system may include an employer practices module communicatively coupled with at least one of the one or more storage mediums. The employer practices module may be configured to identify multiple practices of the organization. The employer practices module may be configured to associate each of the multiple practices with one or more impact factors. Each respective impact factor may represent an impact of the respective practice on employees based on their associated attributes. The system may include a retention probability module communicatively coupled with at least one of the one or more storage mediums. The retention probability module may be configured to calculate multiple retention probabilities. Each retention probability may represent a probability that one or more of the multiple employees will remain employed during a time period at the organization based on the impact factors associated with respective employees.

Some embodiments of the system for workforce planning for an organization may include a simulation module communicatively coupled with at least one of the one or more storage mediums and configured to simulate a workforce composition for the organization utilizing the multiple retention probabilities for multiple time periods. Some embodiments of the system for workforce planning for an organization may include an optimization module communicatively coupled with at least one of the one or more storage mediums and configured to optimize selection of a subset of the multiple practices for the organization based at least in part on the calculated retention probabilities.

In some embodiments, a machine-readable storage medium including executable instructions for modeling a workforce of an organization is provided. The executable instructions may include code for identifying multiple employee attributes. The executable instructions may include code for associating selected attributes of the multiple employee attributes with each employee from the multiple employees of the organization. The executable instructions may include code for identifying multiple practices of the organization. The executable instructions may include code for associating each of the multiple practices with one or more impact factors. Each respective impact factor represents an impact of the respective practice on employees based on their associated attributes. The executable instructions may include code for calculating multiple retention probabilities. Each retention probability may represent a probability that one or more of multiple employees will remain employed during a time period at the organization based on the impact factors associated with respective employees.

Some embodiments of the machine-readable storage medium including executable instructions for modeling a workforce of an organization may include code for simulating a workforce composition for the organization utilizing the multiple retention probabilities for multiple time periods. Some embodiments of the machine-readable storage medium including executable instructions for modeling a workforce of an organization may include code for optimizing selection of a subset of the multiple practices for the organization based at least in part on the calculated retention probabilities.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates a table of workforce requirements for an organization in accordance with various embodiments.

FIG. 5 illustrates a mobility probability table for an organization in accordance with various embodiments.

FIG. 10 provides a table illustrating an example mapping of employer programs to retention drivers in accordance with various embodiments.

FIG. 12 provides a matrix of employer program impacts based on employee attributes.

FIG. 13 provides a table of employer program impacts in accordance with various embodiments.

FIG. 15 provides a best solution for an optimization of a strategic workforce planning session in accordance with various embodiments.

DETAILED DESCRIPTION

Simulation and optimization technologies are described to manage human capital decisions. Decision making systems, devices, methods, and software and related tools are set forth to support the development and implementation of workforce strategies, programs, and policies. In the systems, devices, methods, and software described, resources may be allocated to specific practices (policies, programs, initiatives, organizational culture) used to attract and retain valued employees. Resources may be increased or decreased in various simulations until the proper allocation of resources is identified to enable the achievement of specific goals (e.g., attraction, retention, readiness, and representation).

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, methods, and software are described for developing strategic workforce forecasts (in terms of numbers, skills, demographics, locations, timing) linked to business plans and financial and operational forecasts. The movement of people into, within, and out of the organization may be modeled, factoring in employee attributes. Such attributes may include demographics, skill and performance data, information on the current and potential practices that impact attraction, retention and movement, and economic or environmental factors that will impact the business and/or workforce. The outcome of the process may be made up of a set of gaps between actual workforce and forecasted workforce requirements. A decision-making optimization-based model may then be used to determine the optimal strategy.

Figure 1:
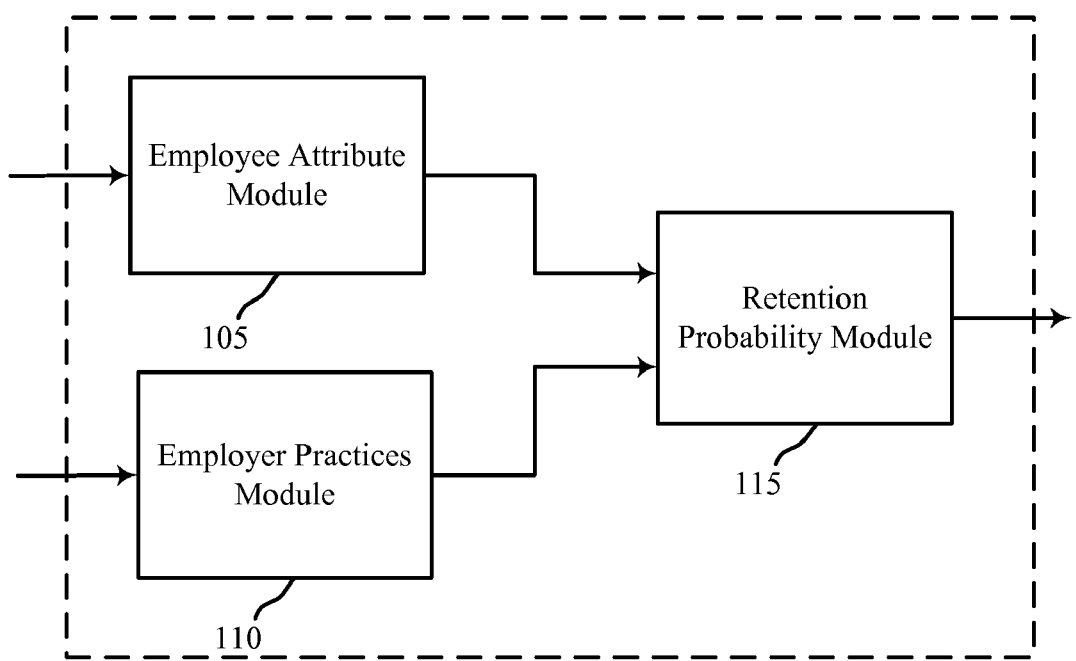
FIG. 1 illustrates a block diagram of a workforce planning system in accordance with various embodiments.

FIG. 1 illustrates aspects of a workforce planning system 100 in accordance with various embodiments. Workforce planning system 100 may include an employee attribute module 105. Employee attribute module 105 may identify multiple employee attributes. Attributes may describe the characteristics of an employee, which may include, but are not limited to, age, gender, ethnicity, work experience, education, performance or talent review rating, etc. Employee attribute module 105 may associate selected employee attributes with each employee of an employer, which may be referred to herein also as an organization. The organization may have multiple employees for which different attributes are associated. Employee attribute module 105 may be configured to associate employee attributes with current employees and/or potential employees. Further aspects of employee attribute module 105 are described in more detail below.

Workforce planning system 100 may include employer practices module 110. Employer practices module 110 may be configured to identify multiple practices of the organization. Employer practices may describe different programs, practices, and/or policies that may impact attraction, movement, and retention of current and/or potential employees. Employer practices may include, but are not limited to, education programs, flex-time practices, healthcare plans, retirement plans, incentive pay plans, compensation plans, recognition/awards, ombudsman programs, training programs, mentoring programs, and/or diversity/inclusiveness practices. Employer practices module 110 may be configured to associate each of the practices with one or more impact factors. The impact factor may represent an impact of a respective practice on employees based on their associated attributes. Employer practices module 110 may be configured to identify practices of the organization for current practices and/or potential practices of the organization. Further aspects of employer practices module 110 are described in more detail below.

Workforce planning system 100 may include a retention probability module 115. Retention probability module 115 may calculate multiple retention probabilities. Each retention probability may represent a probability that one of the employees will remain employed during a time period at the organization based on the impact factors associated with respective employees. Further aspects of retention probability module 115 are described in more detail below.

Figure 2:
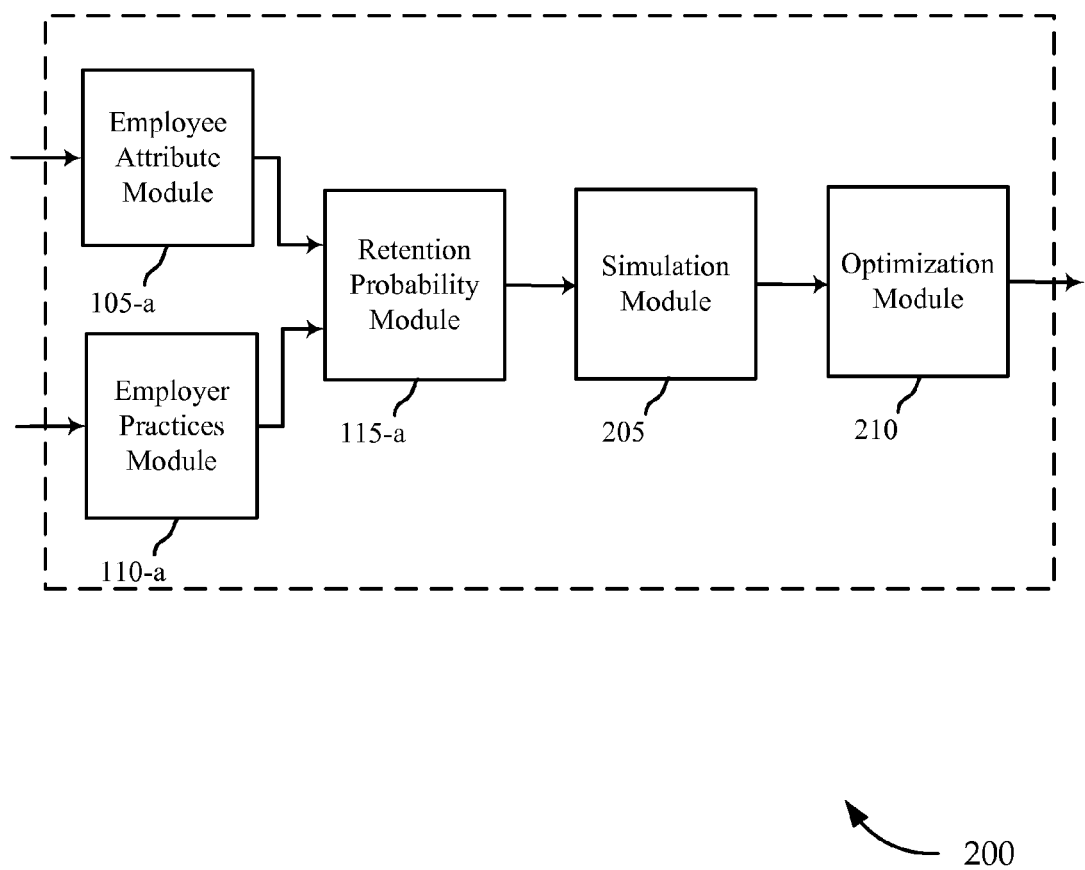
FIG. 2 illustrates a block diagram of a workforce planning system in accordance with various embodiments.

FIG. 2 illustrates aspects of a workforce planning system 200 in accordance with various embodiments. Workforce planning system 200 may include aspects of workforce planning system 100. For example, workforce planning system 200 may include modules such as employee attribute module 105-a, described as employee attribute module 105 of system 100. Workforce planning system 200 may include modules such as employer practices module 110-a, described as module 110 of system 100. Workforce planning system 200 may include modules such as retention probability module 115-a, described as retention probability module 115 of system 100.

Workforce planning system 200 may include simulation module 205. Simulation module 205 may be configured to simulate a workforce composition for the organization utilizing multiple retention probabilities for multiple time periods. Simulation module 205 may receive retention probabilities from retention probability module 115-a. Further aspects of simulation module 205 are described in more detail below.

Workforce planning system 200 may include optimization module 210. Optimization module 210 may be configured to optimize selection of practices for the organization based at least in part on the calculated retention probabilities. Optimization module 210 may work in conjunction with simulation module 205. Further aspects of optimization module 210 are described in more detail below.

Figure 3:
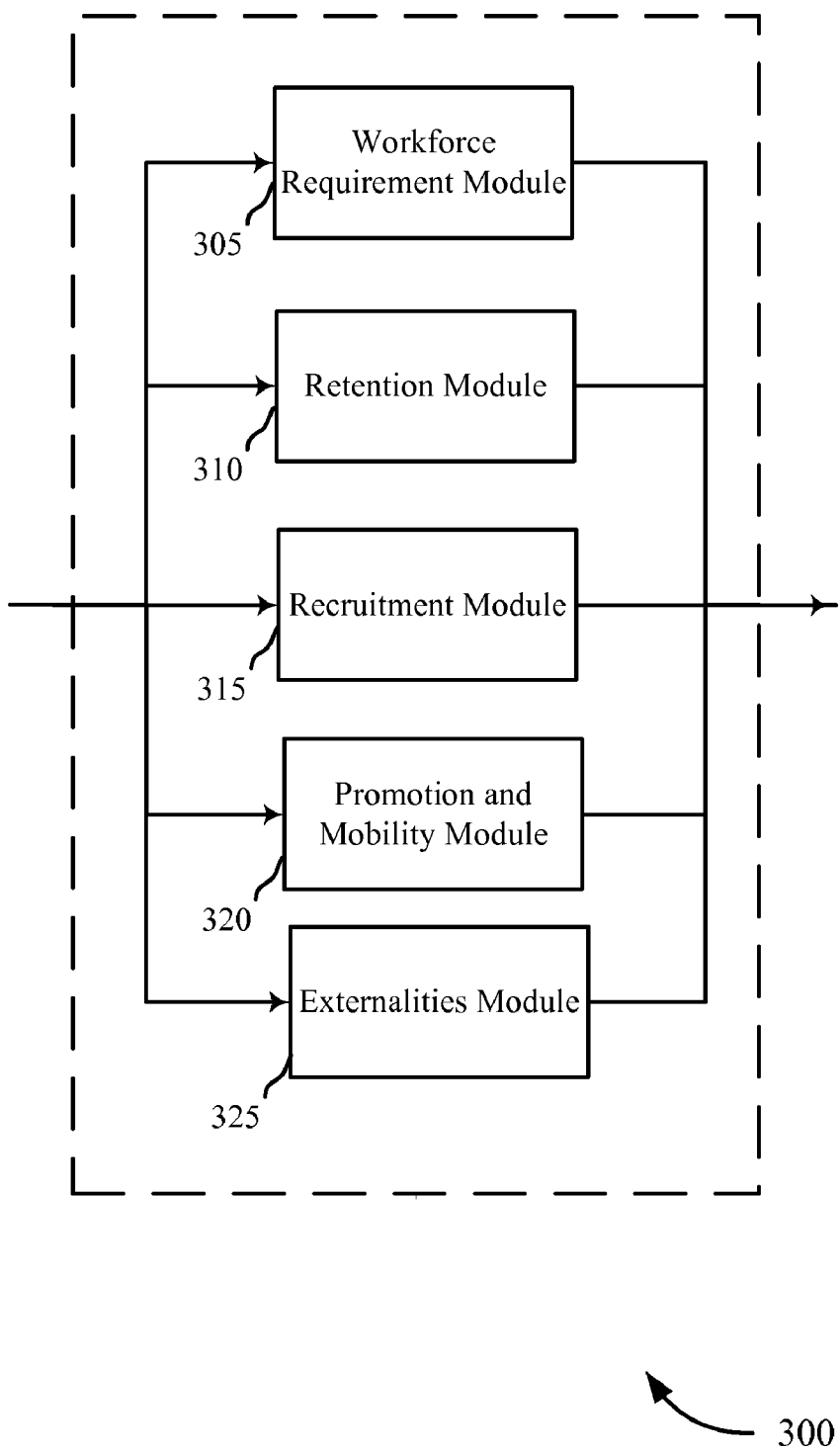
FIG. 3 illustrates a block diagram of a workforce planning system in accordance with various embodiments.

FIG. 3 illustrates aspects of a workforce planning system 300 in accordance with various embodiments. Workforce planning system 300 may include aspects of workforce planning systems 100 and/or 200. For example, workforce planning system 300 may include retention module 310, which may include modules such as employee attribute module 105, employer practices module 110, and/or retention probability module 115. In some embodiments, workforce planning system 300 may be utilized as part of a simulation module such as simulation module 205 of system 200.

Workforce planning system 300 may include workforce requirement module 305. Workforce requirement module 305 may be configured to identify job descriptions for one or more time periods. In some embodiments, each job description may include at least one job requirement. Workforce requirement module 305 may be configured to assign each employee of an organization to a respective job description from the multiple of job descriptions. Further aspects of workforce requirement module 305 are described in more detail below.

Workforce planning system 300 may include promotion and mobility module 320. Promotion and mobility module 320 may identify job descriptions that have not been assigned to at least one employee for one or more time periods. In some embodiments, promotion and mobility module 320 may also identify a promotion for at least one of the employees to the at least one not assigned jobs based on at least one attribute associated with the employee. In some embodiments, promotion and mobility module 320 may also identity movement of an employee from one job or job location to another. Further aspects of promotion and mobility module 320 are described in more detail below.

Workforce planning system 300 may include recruitment module 315. Recruitment module 315 may be configured to identify recruitment channels to provide potential employees for different job descriptions that have not been assigned to at least one employee. Recruitment module 315 may be configured to identify recruitment channels for different time periods. Recruitment module 315 may be configured to determine potential employees to fill job descriptions that have not been assigned to at least one respective employee. Further aspects of recruitment module 315 are described in more detail below.

Workforce planning system 300 may include externalities module 325. Externalities module 325 may be configured to identify externalities such as economic factors that may have an impact on employee decisions to remain with a company, practices an organization may adopt, and/or the ability of an organization to recruit new employees, merely by way of example. Further aspects of recruitment module 325 are described in more detail below.

The modules of systems 100, 200, and 300 may include, for example, one or more server computers, workstations, web servers, or other suitable computing devices. The modules may be fully located within a single facility or distributed geographically, in which case a network may be used to integrate different components. The modules may be configured to communicate with a data store. The modules may manage different aspects of the workforce plan modeling. The functions of each module may also be implemented, in whole or in part, with instructions embodied in a memory, formatted to be executed by one or more general or application-specific processors. Modules may also be implemented in hardware and/or software.

Modules such as modules 105, 110, and 115 may be communicatively coupled with each other. In some embodiments, modules such as 105, 110, and 115 may also be communicatively coupled with one or more storage mediums. Similar communication may also be found with the modules in systems 200 and 300.

I. The Workforce Planning Models: In some embodiments, workforce planning systems, such as systems 100, 200, and/ or 300 and their associated modules may be utilized to develop and to implement workforce planning models. Workforce planning models may be based on an agent-based simulation model. In some embodiments, individual employees are simulated as "computerized agents" that interact with their environment and periodically make decisions about their career in the organization (the agent-based simulation looks at individual employees in the abstract).

In some embodiments, employee decisions are defined by the organization's practices (e.g., policies, programs, initiatives, work environment) and current and future job opportunities. Embodiments may consider probabilistic impacts of different organization practices given specific employee attributes. For different time periods, embodiments of different workforce planning systems may model how each employee makes a decision (according to a probability) of whether s/he stays in the organization for another period, and how the organization may make decisions (again, probabilistically) about the assignment of employees to particular jobs, the promotion and movement of employees, and/or the recruitment of new hires to fill available positions. Embodiments of different workforce planning systems may also reflect how the organization may also make decisions about which practices to start, enhance, reduce, and discontinue.

Users may define the optimization objectives, identifying the goal or goals the model may optimize (typically related to readiness, cost, diversity representation, etc.), and other key measures of success. A set of parameters may also be defined that govern a simulation, including length of the planning horizon, the practices to be included in the simulation, changes in business strategy/priorities and environmental factors (e.g., economic outlook, talent availability, business outlook) that need to be factored into the simulation, and constraints (e.g., budget limitations). The output of each simulation may be represented as a set of metrics that relate to goal achievement.

A number of different optimization algorithms may be used to optimize workforce planning. A user interface may be implemented in software to structure the planning process. This may be delivered through a web interface deployed through a software-as-a-service (SAS) sales model.

In one embodiment, the basic steps in building a model are as follows, although a number of different steps and combinations may be used in other embodiments. Embodiments may be implemented using workforce planning systems such as system 100, 200, and/or 300 and may utilize the different modules of these respective systems. Some embodiments may utilize some or all of these steps and may include additional steps as described below. In some embodiments, building a model may include the following steps: (a) define workforce requirements; (b) define key attributes most relevant to categorizing employees (e.g., gender, ethnicity, age, job level, performance rating, etc.); (c) identify current and proposed organization practices, such as HR policies, programs and initiatives designed to influence employee attraction, retention, and movement within the organization; (d) determine the impact of each practice such as policy, program, and initiative on employees with different attributes; (e) define current and potential recruitment channels and practices; and (f) define assumptions with respect to promotion and movement within the organization.

Tools and templates may be provided for data collection, external data to support model assumptions (e.g., correlation between a specific practice and the corresponding retention rates based on demographics), recruiting channel effectiveness in recruiting employees with specific attributes, guidance in determining relevant inputs to the model, and seasoned judgment in the formulation of components of the model which are more subjective, either by nature or due to the lack of historical data when the model is first developed.

A. Define Workforce Requirements

A forecast of talent requirements given likely business scenarios may be defined, translating business plans into a specific workforce profile or staffing plan—number of positions, types of skills, timing, location, etc.—and identifying those factors that could change the required profile so that contingency plans can be developed. Some embodiments may utilize a workforce requirement module, such as workforce requirement module 305 of FIG. 3, as part of this process.

Varying levels of specificity of business assumptions may be used (e.g., is there a direct relationship between revenue/volume and headcount requirements? What productivity improvements are anticipated? Will a change in business direction require different skills?). It may be appropriate to start out with a relatively simplistic planning process and build sophistication over time.

In some embodiments, a workforce requirement module may define specific job requirements (e.g., knowledge/skills/abilities, education and experience, certifications). The requirements may be taken from existing job descriptions or job postings. FIG. 4 illustrates an example table 400 of workforce requirements for an engineering services company, although this may take a variety of forms in other embodiments.

Column 1 410 includes the different job categories (i.e., job families, job types, roles, etc.) to be included in the workforce planning simulation. Columns 2 through 5 420 include the minimum job requirements an employee must meet in order to be qualified for that job category. The number and type of requirements may depend on each organization, and various combinations may be accommodated. The precision of the model may, to some extent, depend on the level of detail in specifying job requirements and employee attributes that relate to job requirements.

Column 6 430 may be used to assign a priority to each job category. This priority may reflect the relative importance of filling that position, either internally or by recruiting a new employee. In other words, a job with a higher value may be given priority over one with a lower value if and when the two jobs are competing for resources (i.e., budget). Column 7 440 includes the salary range minimum, average salary, or another proxy for average hiring rate for each job. The model may use this information to estimate new hire salaries.

The remaining columns 450 include the estimated quantity requirements for each category during upcoming periods. Planning can be done on a quarterly, biannual, annual, or other basis.

The workforce requirement model may drive the planning process, in that readiness will be measured as the extent to which the defined job requirements are met. Therefore, the model may drive job assignments, promotions and other internal movement, and hiring decisions during various simulations.

B. Define the Attributes Relevant to Categorizing Employees

Embodiments may also identify employee attributes to be considered in the model. Some embodiments may utilize an employee attribute module, such as employee attribute module 105 of systems 100 and/or 200, or as part of retention module 310 of system 300, as part of this process. Attributes may describe the characteristics of an employee, which may include, but are not limited to, age, gender, ethnicity, work experience, education, performance or talent review rating, etc. Attribute values may be used to classify employees for the purpose of assessing the impact of different HR decisions on different groups of employees. For instance, employees may be tracked by two attributes: Gender and Age. Then, within Gender we have two values: Male and Female; and within Age we have four values: Veterans, Baby Boomers, Generation X, and Generation Y. As an example, if an organization were to implement a policy that allows for flex-time, a highly positive impact may be predicted on the retention rate of Female, Generation Y employees, whereas we would expect little or no effect on the retention of Male, Baby Boomers.

C. Identify Current and Potential Employer Practices

In some embodiments, a comprehensive inventory of employer practices currently in place that impact attraction, movement, and retention may be developed, as well as any proposed modifications to current practices, and any practices being considered for future implementation. Some embodiments may utilize an employer practices module, such as module 110 of systems 100 and 200, or as part of retention module 310 of system 300, as part of this process. An interface may be provided that organizes practices into different user-defined attraction and retention drivers. These drivers represent key factors that may affect employee decisions to join an organization or to leave the organization. The drivers may include, but are not limited to, (a) Compensation, (b) Benefits, (c) Career Development Opportunities, (d) Work-Life Balance, (e) Manager Quality, (f) Company Reputation and Performance, (g) Company Culture and Work Environment, and (h) Job Satisfaction. These drivers may be modified to reflect any categorization scheme used by the organization.

D. Determine the Impact of Each Practice on Employees with Different Attributes

Some embodiments may determine the impact of each practice on an employee's behavior based on relevant employee attributes. Some embodiments may utilize different modules, such as a retention probability module as seen with retention probability module 115 of systems 100 and 200, or as part of retention module 310 of system 300, as part of this process. Some embodiments may utilize an employee attribute module 105 as seen with employee attribute module 105 of systems 100 and 200, or as part of retention module 310 of system 300 and/or employer practices module 110 as seen with employee practices module 110 of systems 100 and 200, or as part of retention module 310 of system 300, as part of this process. Historical data, external benchmark data and anecdotal data, and informed judgment as to the expected impact of different practices on employees with specific attributes may be considered. Employee surveys may also be used.

E. Define Current and Potential Recruitment Channels

In addition to considering the impact of various employer practices on current employees, some embodiments may consider the effectiveness of alternate recruiting channels in bringing employees into the organization. Some embodiments may utilize a recruitment module, such as recruitment module 315 of system 300, as part of this process. For each current and potential future recruiting channel, the following parameters (or any combination thereof) may be defined for some embodiments: (1) a probability distribution of the population in that channel, as defined by key employee attributes; (2) a cost-per-hire figure for that channel by job level; (3) an effectiveness factor for that channel by job level that defines the efficiency of obtaining recruits; and (4) a maximum number of new hires that can be obtained from that channel, by job level or any combination of employee attributes.

The model may be populated with available published data on common channels (e.g., universities, job sites, etc.), but parameters related to effectiveness and cost will vary by organization, so the model will be enhanced by historical, company-specific data. The probability distribution of the population in a channel may define the likelihood that a new hire will have certain desired attributes.

The cost-per-hire figure for the channel may be set as the average amount it costs an organization to hire a new employee utilizing that particular channel. It may include costs and expenses related to hiring, including, but not limited to, setup costs (i.e., travel costs to a university, setting up a booth at a job fair, etc.), advertising costs, recruiting costs (i.e., recruiters' time, managers' time in interviews, etc.), agency fees, employee referral fees, relocation expenses, signing bonuses, etc. If an organization does not calculate cost-per-hire for each channel, but has a good estimate of average cost-per-hire by job level (e.g., hourly, professional, middle management), each channel's cost-per-hire figure may be derived by multiplying the cost-per-hire times the effectiveness factor, described below.

The effectiveness factor may relate to the efficiency of the channel in yielding qualified candidates for a given job family or level. It may be multi-dimensional, and can consider such factors as percentage of jobs filled by this channel, offers as a percentage of interviews, first-year retention rates, offer acceptance rate. Effectiveness can be measured in many ways.

Finally, an estimate of the maximum number of new hires an organization expects to obtain from each channel may be made for each job family and/or level, during each period. This information may be forecast based on historical recruitment data, adjusted to reflect expected future state, but it may be based simply on the best judgment of in-house recruiting experts.

The data in the recruitment channels may be used to simulate new hires entering the organization, according to alternative recruitment budget allocations across channels and the probability distributions of the population associated with each channel. Such simulation may be done using a simulation module such as simulation module 205 of system 200, merely by way of example.

F. Define Assumptions with Respect to Promotion and Movement within the Organization Some embodiments may consider how a workforce planning model may relate to the mobility of employees within the organization—promotions, job changes, location changes. Some embodiments may utilize a promotion and mobility module, such as promotion and mobility module 320 of system 300, as part of this process. Attributes associated with each employee may include their level within the organization, which may be defined either generically for the entire organization or by defined career paths by job family. Using historic data on mobility, a probability table may be developed. This table may predict the likelihood that employees with various combinations of attributes will move within the organization during the planning timeframe.

FIG. 5 shows an example of a mobility probability table 500 for an engineering services company, merely by way of example. In this example, employees may be described by tenure 510, job level 520, performance rating 530, and personality type 540, and a movement probability 550 is assigned to each employee with a distinct combination of employee attributes, as shown in the last column. Probability 550 may represent the likelihood that an employee with the attributes shown in the first four columns 510, 520, 530, and 540 may change jobs or locations during the upcoming period. These data may be used to simulate promotion/advancement of employees within the organization.

II. Decision Scenario Testing: Once the model has been populated with the data described above (or any subset thereof), different decision scenarios can be tested to predict the outcome of various employer or HR decisions. These decisions may relate to, but not be limited to, the following. Some embodiments that include decision scenario testing may utilize an optimization module, such as optimization module 210 of FIG. 2. Decision scenario testing may also utilize a simulation module, such as simulation module 205 of FIG. 2. Other modules of systems 100, 200, and/or 300 may also be utilized in different embodiments.

Changes in employer practices: An organization may prioritize the practices it may implement, maintain, change, or discontinue, and the level of funding for each. One application of the model is to determine the budget allocation that results in the highest possible level of readiness while meeting defined representation goals. Some embodiments may utilize an employer practices module, such as employer practices module 110 of systems 100 and 200, or as part of retention module 310 of system 300, as part of this process.

Allocation of recruitment budget: The model may consider how budget dollars are allocated across recruitment channels in simulating movement into the organization. One application of the model is to determine the budget allocation that will most likely enable the organization to achieve readiness and representation/diversity goals.

Economic/business outlook and other environmental parameters: Factors such as economic forecasts, the unemployment rate, financial strength of the organization, demand and supply gaps for certain skills, etc., affect employee decisions about staying in a job or seeking other employment opportunities. How this factor is defined may be unique to each organization, depending on the factors that are most relevant to an organization and the degree to which these factors can be based on quantitative metrics. Some embodiments may utilize an externalities module, such as externalities module 325 of system 300, as part of this process.

Figure 6:
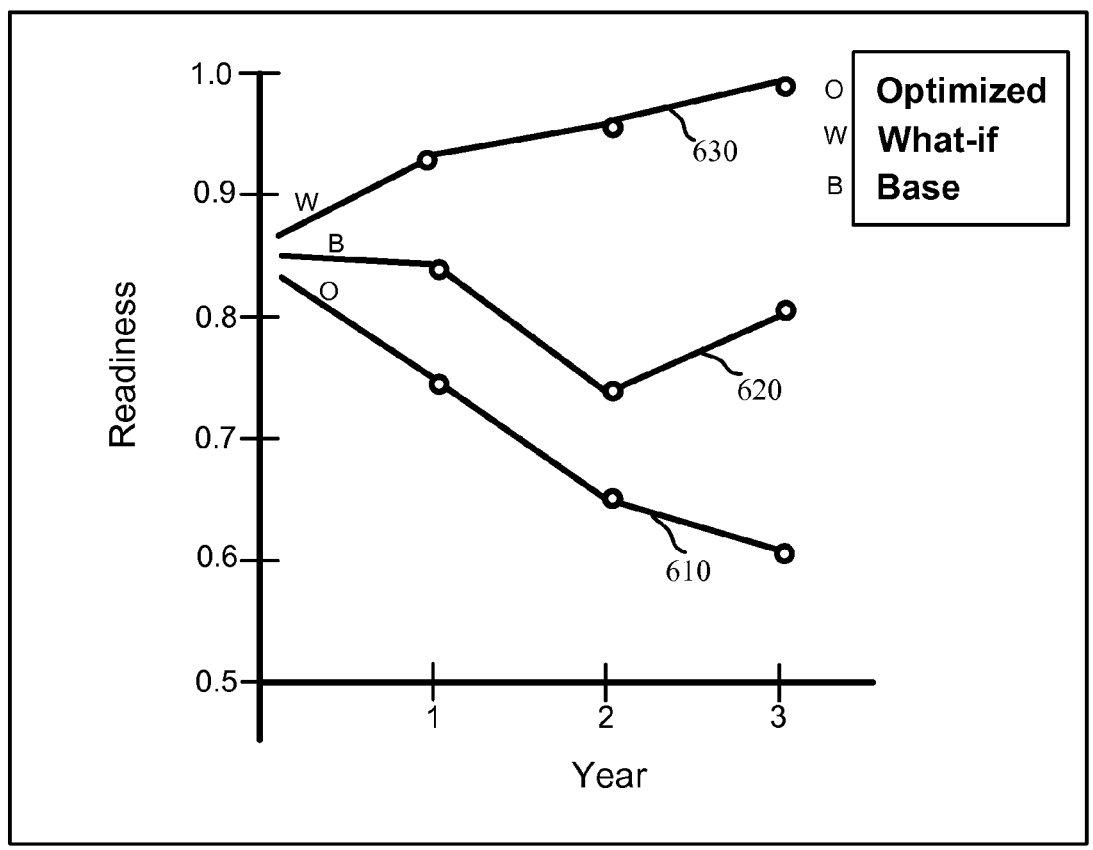
FIG. 6 illustrates a graph illustrating a comparison between different workforce planning scenarios where one or more of the decisions are varied in accordance with various embodiments.
Figure 7:
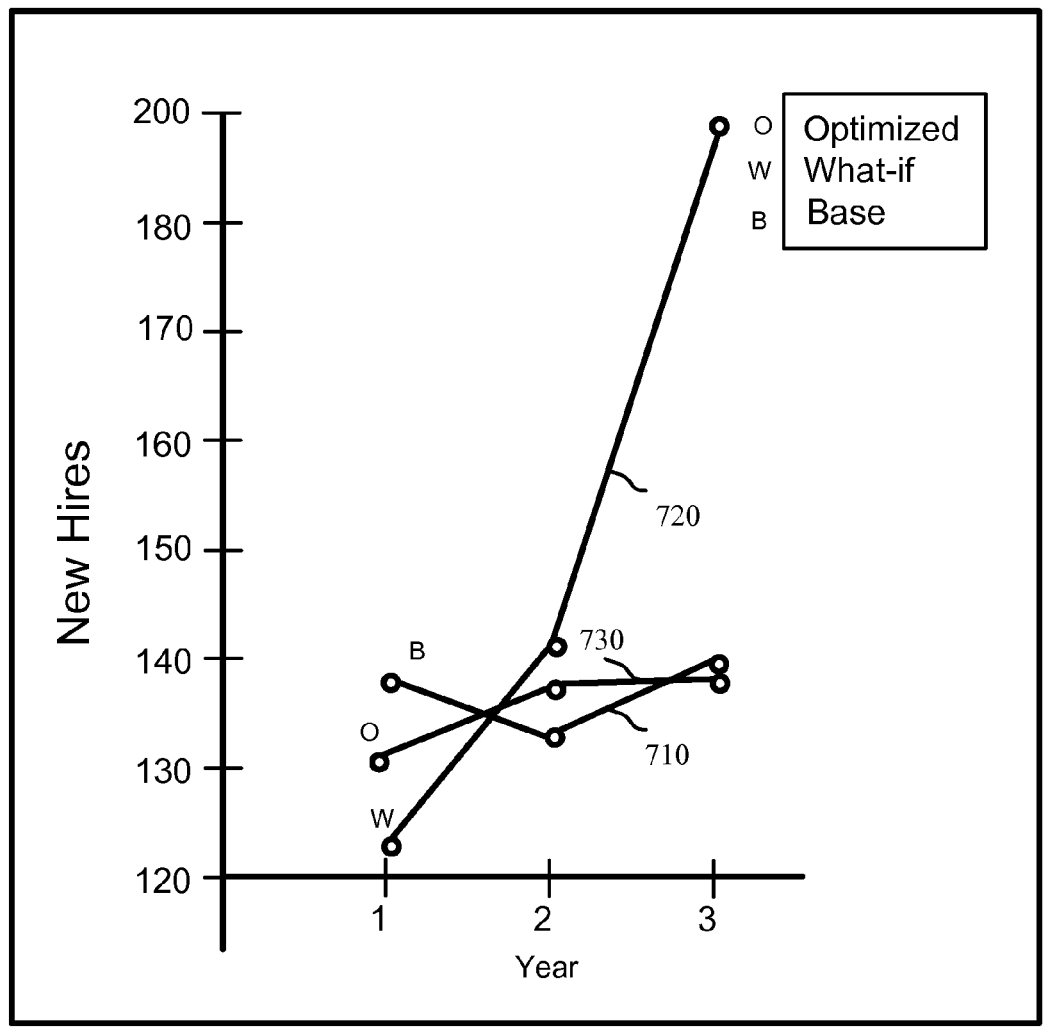
FIG. 7 illustrates a graph illustrating a comparison between different workforce planning scenarios where one or more of the decisions are varied in accordance with various embodiments.
Figure 8:
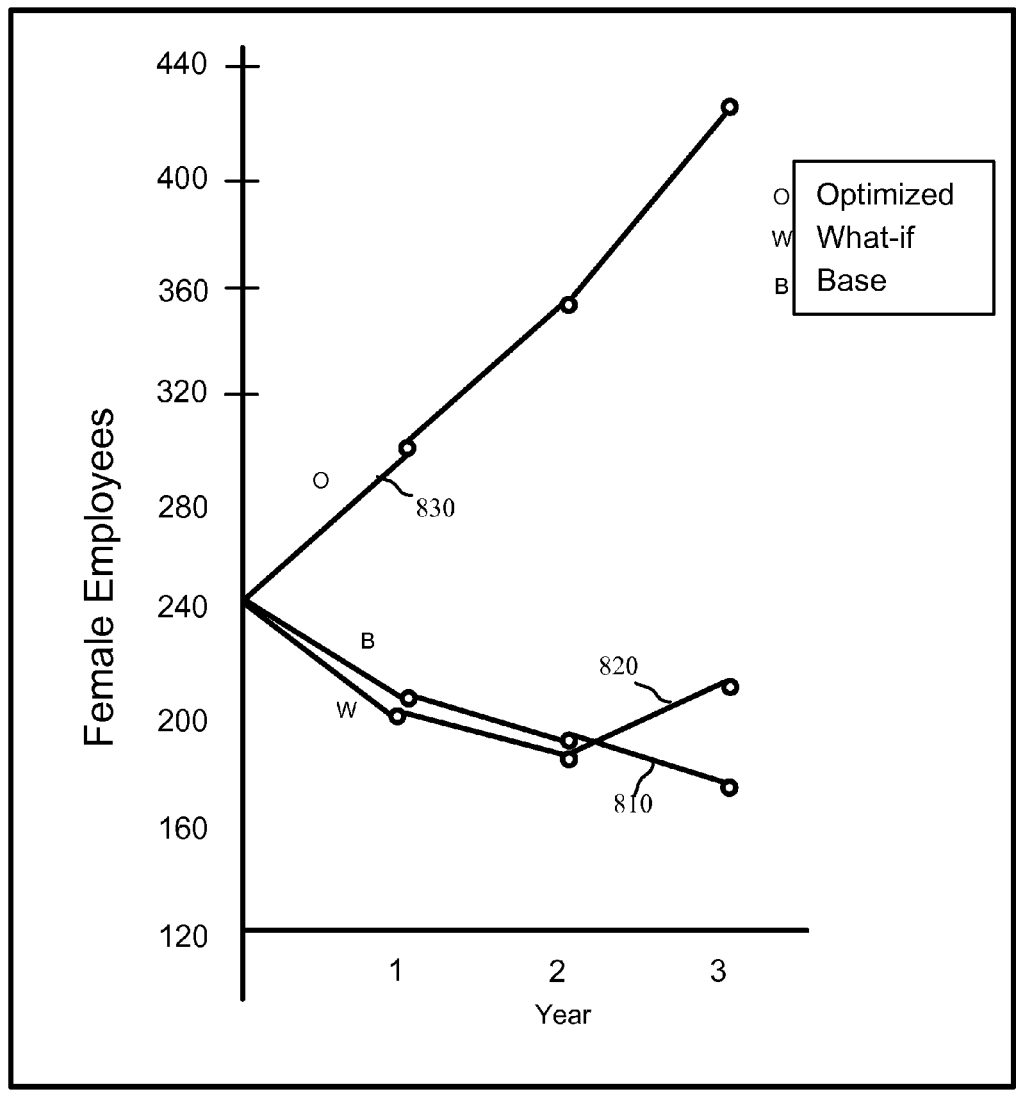
FIG. 8 illustrates a graph illustrating a comparison between different workforce planning scenarios where one or more of the decisions are varied in accordance with various embodiments.

FIGS. 6-8 show graphs 600, 700, 800 illustrating example comparisons between different scenarios where one or more of the decisions described above are varied. The first scenarios, which are denoted as the Base scenarios 610, 710, 810 respectively, may refer to the situation where the organization continues to conduct business as usual; in other words, no new employer/HR practices are added or modified, and investment in current recruitment channels remains the same. The second scenarios, denoted What-if 620, 720, and 820 respectively, represent the cases where the user has manually changed certain decisions to add or modify an HR practice, or to reallocate recruitment investments. The third scenarios, denoted Optimized 630, 730, and 830 respectively, refer to the solution found to be the best solution using one or more optimization algorithms.

Referring first to FIG. 6, although the starting readiness level is about 85%, both the base and the what-if scenarios perform poorly in terms of readiness (reaching levels of 60% and 83% at the end of Year 3, respectively), while the optimized scenario results in an increased readiness level to 97% at the end of Year 3.

Next, referring to FIG. 7, in terms of new hires, after a small upward adjustment from 131 new hires in Year 1 to 137 new hires in Year 2, in order to account for initial turnover, the Optimized 730 scenario becomes stable at 137 new hires in Years 2 and 3. However, since turnover is much higher in the Base 710 and What-if 720 scenarios, the adjustments are much larger, and the number of new hires each year is unstable. The Base 710 scenario requires 137 new hires in Year 1, 133 in Year 2, and 138 in Year 3; the What-if 720 scenario requires 122 new hires in Year 1, 142 in Year 2, and 196 in Year 3.

The composition of turnover may also be analyzed, and with the correct set of HR programs and practices, the Optimized 730 scenario may improve retention of the right kind of employees, described by a certain type of attributes. For example, if an organization wants to increase female representation; then, the organization may be interested in investing its budget in practices/programs designed to increase the probability of retention of female employees, such as a comprehensive healthcare program. Such a program may also increase the probability that other types of employees will stay, but its impact on female employees may be higher. Then, when looking to hire new employees, it may be much easier to reach the desired levels if turnover of female employees were lower to begin with. See, for example, FIG. 8, where the trend in female employees is charted for three years. In Base 810 scenario, the number of female employees decreases steadily if the organization continues with its current HR programs as implemented. In What-if 820 scenario, certain programs have been chosen which are designed to reduce turnover of female employees; however, it takes two years for the downward trend to be overturned, because the hurdle that has to be overcome through hiring is large. This can be explained by considering that, given budget restrictions, the programs chosen under What-if 820 scenario do not produce the biggest impact per dollar invested. On the other hand, Optimized 830 scenario shows an increasing trend in the number of female employees from the start. This is because, under this scenario, the investment in HR programs is chosen to produce the greatest impact in terms of the goal of female retention.

III. Simulation Process

Figure 9:
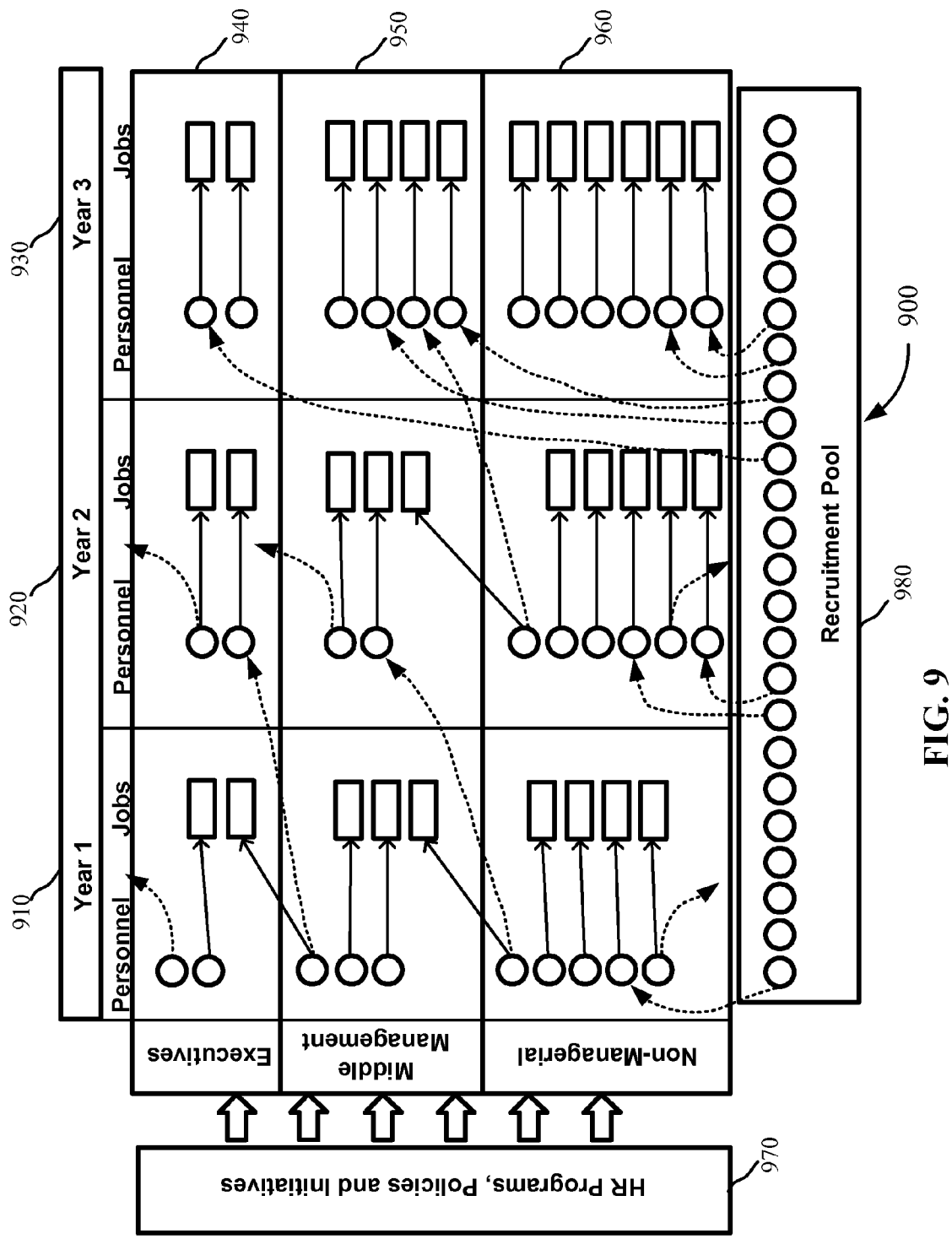
FIG. 9 provides a graphical representation of a workforce simulation process in accordance with various embodiments.

FIG. 9 provides a graphical representation 900 of an embodiment of a workforce simulation process. Some embodiments may utilize a simulation module, such as simulation module 205 of system 200, as part of this process. Other modules may also be utilized, including but not limited to modules as seen in system 300, such as workforce requirement module 305, retention module 310, recruitment module 315, promotion and mobility module 320, and/or externalities module 325. The simulation process may model workforce impacts across a defined number of measurement periods which may be expressed in months, quarters, years, etc. During each measurement period, the following steps may occur: (a) each employee makes a decision whether to stay or leave the organization. This may be decided based on a probabilistic test which calculates the impact of the factors identified above on an employee based on their unique combination of attributes; (b) once all employees have made a decision, employees who remain in the organization are assigned to available jobs, based on the match between employee attributes and job requirements; (c) remaining jobs are filled by employees who have a high probability of mobility/promotion and attributes which match the requirements of the target job; and (d) new employees are recruited from the appropriate recruitment channels to fill open jobs, as long as the budget allows for the additional recruitment.

In FIG. 9, circles represent employees and rectangles represent jobs. Employees may be described as executives 940, middle management 950, or non-managerial 960, merely by way of example. FIG. 9 also show organization policies 970, such as HR programs, policies, and initiatives. In this example, the employee decision and job assignment process is done every year, for three years. FIG. 9 also shows recruitment channels 980, such as recruitment pools. For this example, the initial workforce is composed of two executives, three middle managers and four non-managerial employees. However, during the first year period 910, one executive and one non-managerial employee decide to leave. The remaining employees are assigned to available jobs. In addition, one middle manager is promoted into an executive level job and one non-manager is promoted into a middle manager level job, as depicted by the solid up arrows in the first year. Finally, a new employee is hired to fill an available non-managerial position.

During Year 2 period 920, one executive, one middle manager, and one non-manager are separated; one non-manager is promoted into a middle manager job; and two new employees are hired. During this year, an additional non-managerial job is created, but remains unfilled due to lack of budget.

During Year 3 period 930, there are no promotions; a new middle management job and a new non-management job are created, requiring five new employees to be hired.

IV. Retention Probabilities

FIG. 10 is a table 1000 illustrating an example mapping of programs to retention drivers. An "X" in a matrix cell means that the program is linked to a driver. The table shows a sample matrix. Note that in most cases all options of a particular program are linked to the same driver(s). Table 1000 includes different possible employer practices such as education programs 1010, flexible workplace policies 1020, healthcare policies 1030, and retirement policies 1040. Table 1000 also shows how different employer practices may be linked to different drivers 1050, such as base pay, healthcare plan, career development, work/life balance, manager quality, company reputation, pay for performance, retirement plan, and/or company culture.

Embodiments may use a variety of different modules as part of the following processes. For example, some embodiments may utilize an employee attribute module, such as employee attribute module 105 of systems 100 and/or 200, as part of this process. Some embodiments may utilize an employer practices module, such as employer practices module 110 of systems 100 and/or 200, as part of this process. Some embodiments may utilize a retention probability module, such as retention probability module 115 of systems 100 and/or 200, and/or retention module 310 of system 300, as part of this process.

Figure 11:
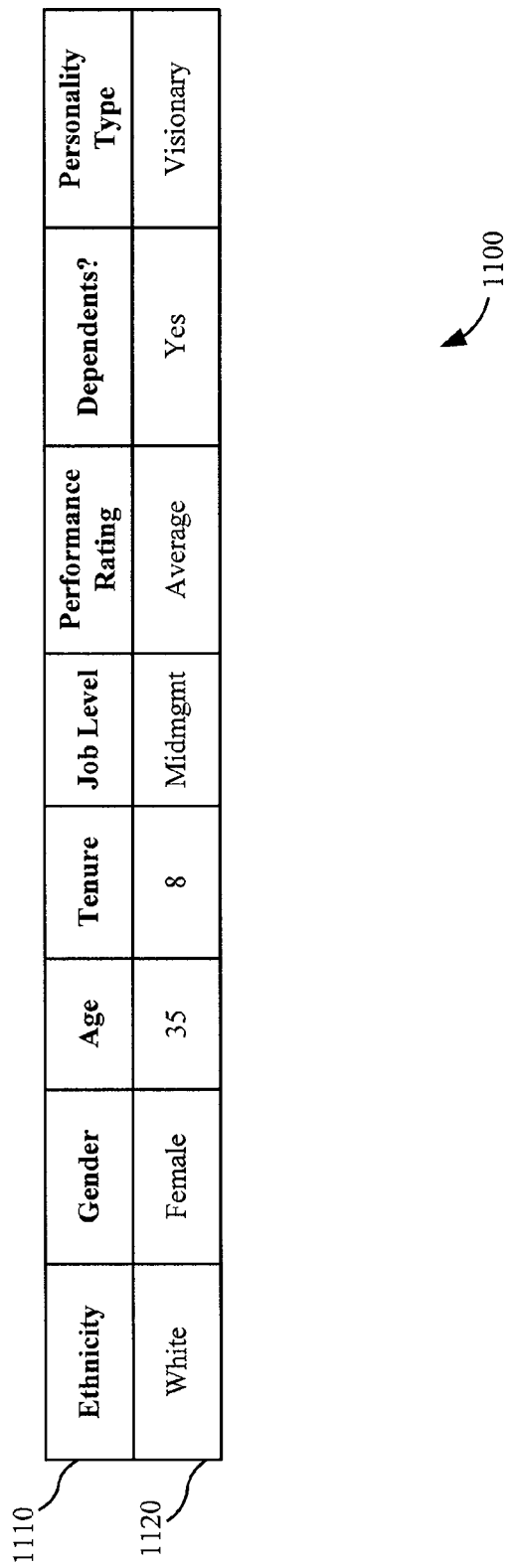
FIG. 11 provides an example of an employee description with employee attributes in accordance with various embodiments.

Employees may be described by a set of attributes. An example of an employee description is shown in the table 1100 of FIG. 11. Some embodiments may utilize an employee attribute module, such as module 105 of systems 100 and/or 200, as part of this process. FIG. 11 shows general attributes 1110 and specific attributes 1120 for the employee description.

A matrix of practice impacts may be created based on employee attributes. FIG. 12 is an example of such a matrix shown in a table format 1200, with impacts coded as follows: −3=highly negative, −1=negative, 0 or blank=neutral (no impact), 1=positive, 3=highly positive. FIG. 12 also shows different potential practices of the organization, such as education programs 1210, flexible workplace practices 1220, healthcare plans 1230, and retirement plans 1240. FIG. 12 furthermore shows employee attributes 1250, such as ethnicity, gender, age, tenure, job level, performance rating, dependents, and personality type. Some embodiments may utilize an employer practices module, such as module 110 of systems 100 and/or 200, as part of this process.

The probability of retention for a particular employee, P(r), may computed as:

$$P(r) = \Delta P(r) + \text{Base},\quad\text{Eq. 1}$$

where $\Delta P(r)$ is the change in retention probability from the implementation of a set of programs, and Base is the base (or current) retention probability for the employee. The Base may be obtained from historical records. Some embodiments may utilize a retention probability module, such as retention probability module 115 of systems 100 and/or 200, and/or retention module 310 of system 300, as part of this process.

$\Delta P(r)$ may be calculated from the impact of the programs. The impact may be calculated as:

$$\text{Impact} = \beta[\alpha_1 S(d_1) + \alpha_2 S(d_2) + \ldots + \alpha_n S(d_n)],\quad\text{Eq. 2}$$

where $\alpha(i)$ is the industry-wide impact weight of driver i, $S(d_i)$ is the impact score of driver i for the employee, and $\beta$ is a normalizing constant.

The industry-wide impact weights may represent the relative importance of each driver, and may be obtained from existing survey data. For example, in one embodiment, the industry-wide impact weights may be as follows:
$\alpha(\text{Base Pay})=0.79$, $\alpha(\text{Healthcare})=0.31$, $\alpha(\text{Career Devel})=0.27$, $\alpha(\text{Work/Life})=0.26$, $\alpha(\text{Manager})=0.50$, $\alpha(\text{Company Reputation})=0.18$, $\alpha(\text{Pay for Performance})=0.31$, $\alpha(\text{Retirement})=0.25$, $\alpha(\text{Culture})=0.13$ An employee impact score for each driver may be set as the score, given the employee's attributes, that produces the absolute maximum impact. For example, for the employee described by FIG. 11, the program impacts would be as shown in the table 1300 of FIG. 13. FIG. 13 also shows different potential practices of the organization, such as education programs 1310, flexible workplace practices 1320, healthcare plans 1330, and retirement plans 1340. FIG. 13 furthermore shows employee attributes 1350, such as ethnicity, gender, age, tenure, job level, performance rating, dependents, and personality type.

The calculation of the final score for each program may be:

if(abs(Min)>=Max)

Final Score=Min;

else

Final Score=Max;

meaning that a negative score dominates a positive score of equal magnitude.

Once the scores for each individual program have been obtained, they may be related back to the drivers. Looking at the driver-program matrix shown in table 1000 of FIG. 10, the "Work/Life Balance" driver is linked to Education Program and Flexible Workplace programs. Therefore, the employee's final score for the "Work/Life Balance" driver may be set to the maximum impact of the linked program scores for those program options that are implemented.

For this example, assume that the implemented program options are No Tuition Reimbursement within Education Programs, and Flexible Start Time within the Flexible Workplace program. This employee described by FIG. 11 would have a score of −1 for Education Programs and 3 for Flexible Workplace, resulting in an overall score for the "Work/Life Balance" driver of, $S(d_{worklife})=3$. Again, the maximum absolute score is selected where ties favor negative scores.

The normalizing constant, $\beta$, may be calculated as follows. Using the highest positive score for each driver (in this case 3) in the equation:

$$B = \alpha_1 S(d_1) + \alpha_2 S(d_2) + \ldots + \alpha_n S(d_n)\quad\text{Eq. 3}$$

For the example, this would be:

$$B = 0.79(3) + 0.31(3) + 0.27(3) + 0.26(3) + 0.50(3) + 0.18(3) + 0.31(3) + 0.25(3) + 0.13(3) = 9$$

Then, in order to find β, the inverse of B is taken:

$$\beta = 1/B \qquad \text{Eq. 4}$$

$$\text{and again, Impact} = \beta[\alpha_1 S(d_1) + \alpha_2 S(d_2) + \ldots + \alpha_n S(d_n)]$$

However, since it may not be desirable for the retention probability to vary too much (or go beyond 100% or below 0), its impact may be limited. Once the impact score is calculated, the change ΔP(r) in the retention probability may be calculated as:

If the Impact score is positive, then $$\Delta P(r) = (1 - \text{Base})/p * \text{Impact}; \qquad \text{Eq. 5}$$

If the impact score is negative, then $$\Delta P(r) = (\text{Base})/q * \text{Impact} \qquad \text{Eq. 6}$$

where p and q are scalar parameters, limiting the change in retention probability to no more than 1/q and 1/p of the current difference between Base and 0 or 100%, respectively. The new retention probability for the employee may then be calculated as P(r)=ΔP(r)+Base.

Modeling all possible combinations of practices, recruitment budget allocations, and environmental parameters would be computationally challenging, to say the least Therefore, optimization algorithms may be used to find the best solutions to simulation problems efficiently. This enables the user to focus on evaluating a limited number of potential solutions that optimization technology has concluded will most likely yield the best results. Some embodiments may utilize an optimization module, such as optimization module 210 of system 200 as part of this process and that which follows below.

Figure 14:
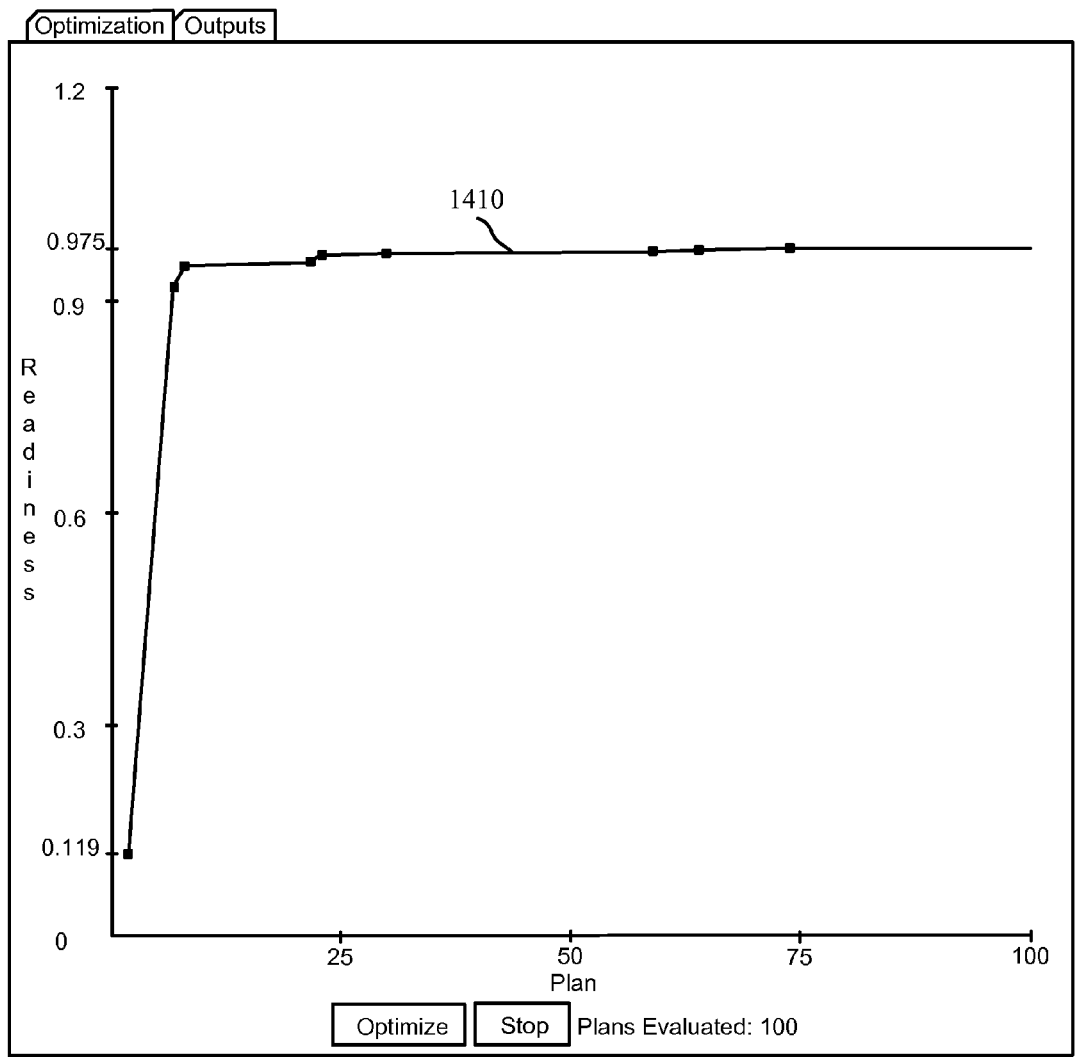
FIG. 14 provides a graph showing the results of an example optimization run of a strategic workforce planning session for an organization in accordance with various embodiments.

The graph 1400 of FIG. 14 shows the results of an example optimization run of a strategic workforce planning session for an engineering services firm. The performance curve 1410 represents the readiness level, and each dot on the performance curve represents an improving solution (set of selected programs) in terms of readiness.

The identified goals for the optimization were to maximize readiness on a three-year planning horizon, while making sure that, at the end of the three years, non-white and female employees would represent at least 30% of the total workforce. In addition, the company imposed a $4M annual recruitment budget, a $10M annual retention budget, a $100M annual compensation budget, and a total annual HR budget (recruitment+retention+compensation) of $105M.

Figure 16:
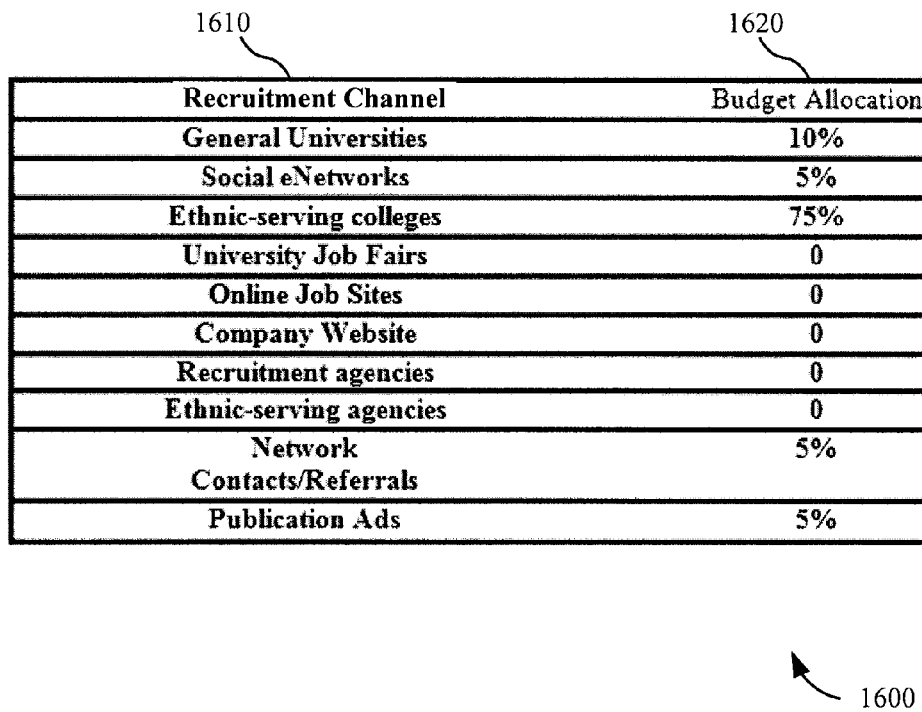
FIG. 16 provides a best solution for an optimization of a strategic workforce planning session in accordance with various embodiments.

Possible best solutions may be shown in tables 1500, 1600 in FIGS. 15 and 16. FIG. 15 shows both general employer practices or programs 1510 and specific employer practices or programs 1520, while FIG. 16 shows recruitment channels 1610 and budget allocation 1620 for each channel. If the program options marked "YES" in table 1500 were implemented, and there were a $4M annual recruitment budget as depicted in table 1600, then the model predicts a readiness level of 96.3% at the end of three years. The total investment in personnel costs and expenses is $94.01M, of which $3.27M is spent in recruitment of new hires and $90.73M is spent in compensation, benefits, and other retention programs.

If this particular solution is simulated to obtain more details, women are expected to grow from 24.7% of the workforce to 39.8%, minorities from 25.5% to 43.5%, and that the age composition of the workforce varies from 35.6% to 40.2% in Generation Y, 23.8% to 42.6% in Generation X, and 40.6% to 25.2% in Baby Boomers. Average annual turnover is 6.7%, total new hires are 39.4%, and total separations are 19.4%.

This could be further drilled down within each job level to view trends in workforce composition, performance ratings, etc. which may aid in proactive decision-making.

Figure 17:
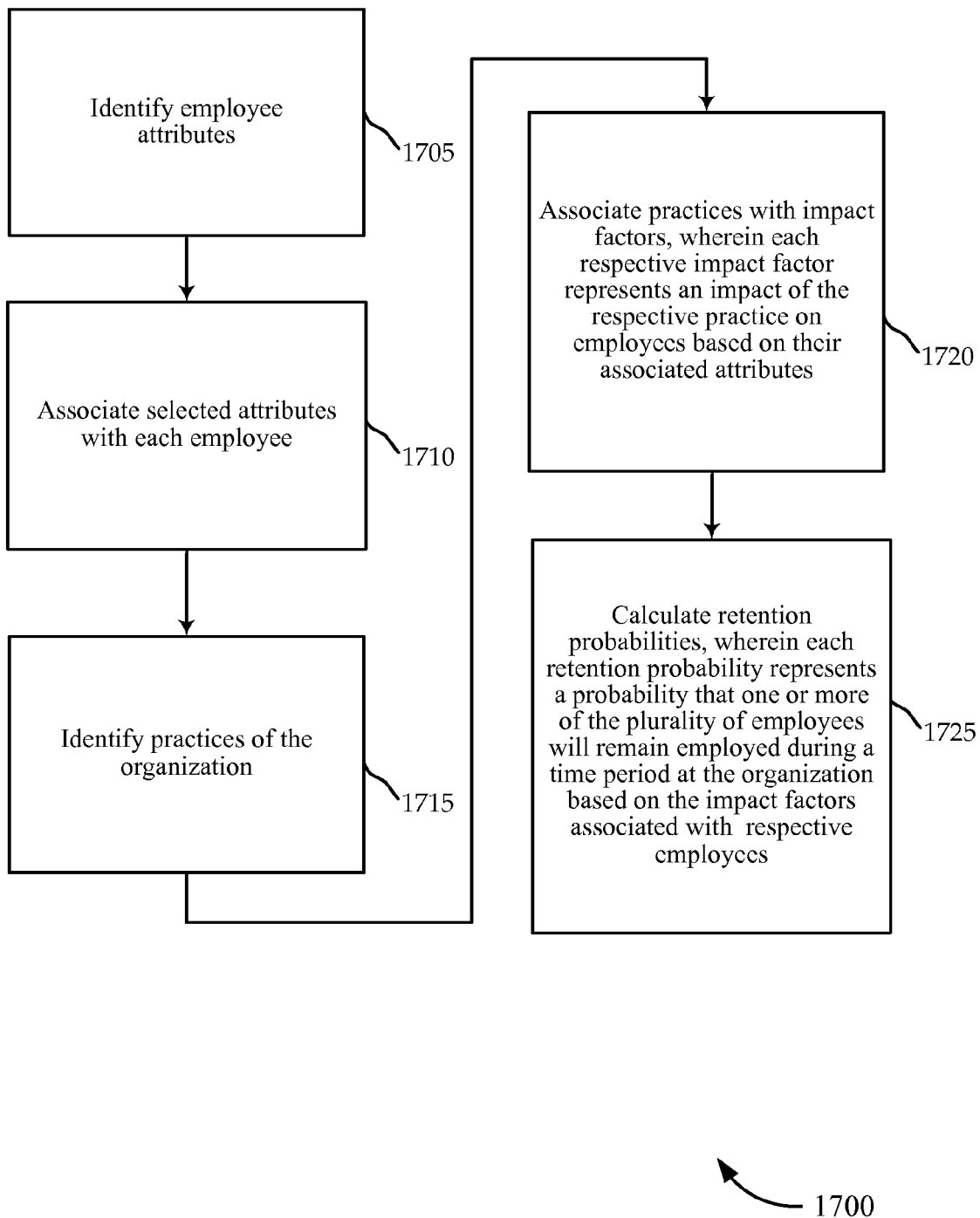
FIG. 17 provides a block diagram of a method of workforce planning for an organization in accordance with various embodiments.

Different methods may be utilized to model workforce composition that may utilize simulations and optimization in some cases as discussed above. For example, FIG. 17 provides a block diagram of a method 1700 of workforce planning for an organization in accordance with various embodiments. Method 1700 may be implemented with systems 100, 200, and/or 300 of FIG. 1, FIG. 2, and FIG. 3 respectively. At block 1705, multiple employee attributes may be identified. At block 1710, selected attributes of the multiple employee attributes may be associated with each employee of the organization; the organization may have multiple employees. The employees of the organization may be current employees and/or potential employees of the organization. At block 1715, multiple practices of the organization may be identified. Practices of the organization may be current practices and/or potential practices of the organization. At block 1720, each of the practices may be associated with one or more impact factors. Each respective impact factor may represent an impact of the respective practice on employees based on their associated attributes. At block 1725, multiple retention probabilities may be calculated. Each retention probability may represent a probability that one or more of the employees will remain employed during a time period at the organization based on the impact factors associated with respective employees.

Figure 18:
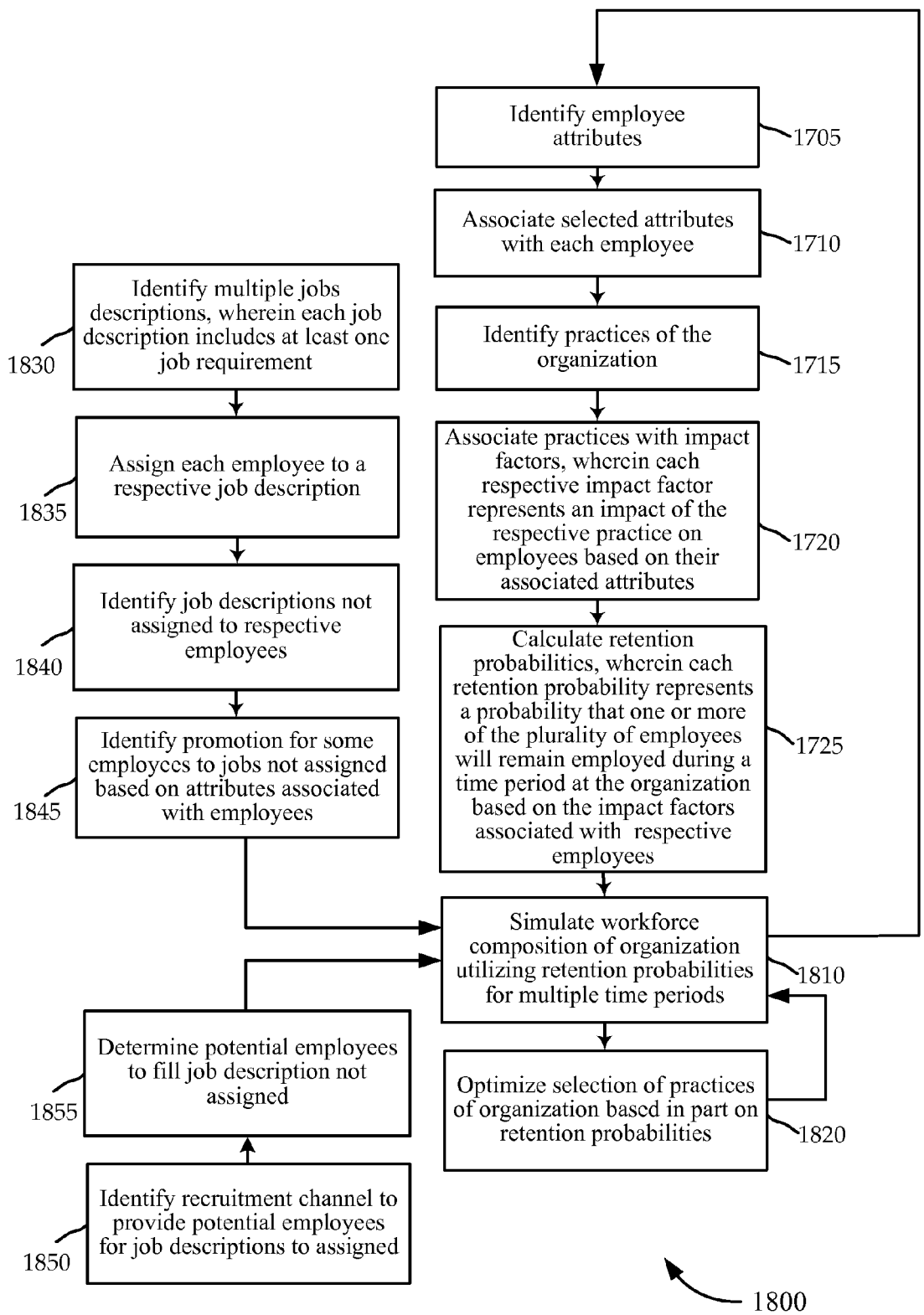
FIG. 18 provides a block diagram of a method of workforce planning for an organization in accordance with various embodiments.

FIG. 18 provides a block diagram of method 1800 of workforce planning for an organization in accordance with various embodiments. Method 1800 may be implemented with systems 100, 200, and/or 300 of FIG. 1, FIG. 2, and FIG. 3 respectively. Method 1800 may include aspects of method 1700, such as the steps performed blocks 1705, 1710, 1715, 1720, and 1725.

At block 1810, workforce composition for the organization may be simulated utilizing the multiple retention probabilities for multiple time periods. After a simulation for a given time period, information regarding retained employees may be utilized for a subsequent time period, providing the information back to blocks 1705-1725. At block 1820, selection practices for the organization may be optimized based at least in part on the calculated retention probabilities. In some embodiments, information from optimization block 1820 may be fed back into simulation block 1820 as part of a simulation-optimization process. Budgets can be used to constrain hiring and practice optimization.

The simulations that may occur at block 1810 may also take into account other information besides retention probabilities. For example, at block 1830, multiple job descriptions may be identified for a given time period. Each job description may include at least one job requirement. At block 1835, each employee may be assigned to a respective job description from the multiple job descriptions. At block 1840, one or more job descriptions that have not been assigned to at least one respective employee may be identified. At block 1845, one or more promotions may be identified for at least one of the employees to at least one non-assigned job based on at least one attribute associated with the employee. This information regarding unassigned jobs and/or job promotions may be provided to block 1810 as part of a simulation process.

At block 1850, a recruitment channel to provide at least one potential employee for at least one job description that is not assigned to at least one respective employee may be identified for a given time period. At block 1855, at least one potential employee may be determined to fill at least one job description that is not assigned to at least one respective employee. This information may be provided to block 1810 as a part of a simulation process.

Figure 19:
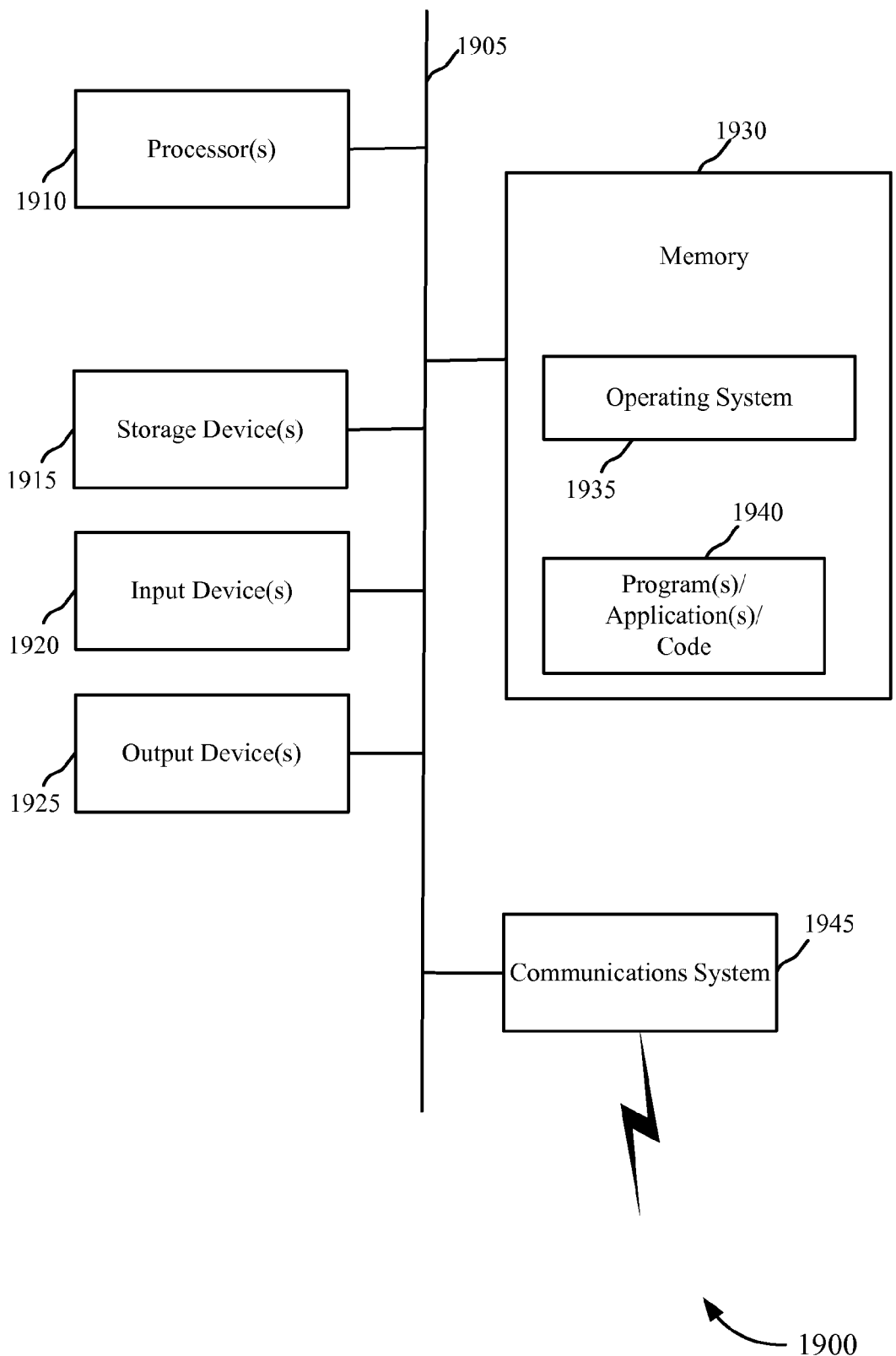
FIG. 19 provides a schematic of a device structure that may be used to implement different embodiments.

Some embodiments of a method of workforce planning may include determining a change in at least one of the retention probabilities based on a change in at least one of the employer practices or employee attributes Methods 1700 and 1800, may be implemented on modules such as those seen in systems 100, 200, and/or 300, and may also be implemented with different device structures. For example, a device structure 1900 may be used to implement the functionality described, which may be illustrated with the schematic diagram of FIG. 19. Structure 1900 may be used, for example, to implement method 1700 of FIG. 17 and/or method 1800 of FIG. 18. Structure 1900 may be used also to implement the modules and different aspects of systems 100, 200, and/or 300 of FIG. 1, FIG. 2, and FIG. 3 respectively. This drawing broadly illustrates how individual system elements of a device may be implemented, whether in a separated or more integrated manner. The example structure is shown made up of hardware elements that are electrically coupled via bus 1905, including processor(s) 1910 (which may further comprise a DSP or special-purpose processor), storage device(s) 1915, input device(s) 1920, and output device(s) 1925. The storage device(s) 1915 may be a machine-readable storage media reader connected to any machine-readable storage medium, the combination comprehensively representing remote, local, fixed, or removable memory, storage devices, or other storage media for temporarily or more permanently containing computer-readable information. The communications systems interface 1945 may interface to a wired, wireless, or other type of interfacing connection that permits data to be exchanged with other devices. The communications system(s) 1945 may permit data to be exchanged with a network.

The structure 1900 may also include additional software elements, shown as being currently located within working memory 1930, including an operating system 1935 and other code 1940, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other media capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of workforce planning for an organization, the method comprising:

identifying a plurality of employee attributes, wherein each employee attribute includes one or more employee attribute values;

associating selected attribute values from the one or more employee attribute values of the plurality of employee attributes with each employee of a plurality of employees of the organization;

identifying a plurality of practices of the organization, wherein each practice of the organization includes one or more specific programs;

generating, utilizing one or more computers, a practice impact matrix comprising a plurality of impact factors, wherein the impact factors of the practice impact matrix represent quantitative measures of impacts of the specific programs of the organization on the employees based the employee attribute values;

calculating, utilizing the one or more computers, a plurality of retention probabilities, wherein each particular retention probability from the plurality of retention probabilities represents a probability that a particular employee from the plurality of employees will remain employed during a time period at the organization based on the impact factors of the practice impact matrix linked with the particular employee based on the selected attribute values associated with the particular employee and each particular retention probability is calculated utilizing an impact calculation that includes a summation of at least one impact factor from the practice impact matrix linked with the particular employee through one of the selected employee attribute values for each of the plurality of practices of the organization and wherein each of the at least one impact factors in the summation is each multiplied by a respective industry-wide impact weight factor linked with the respective practice of the organization; and simulating, utilizing the one or more computers, a workforce composition for the organization utilizing the plurality of retention probabilities for at least the time period.

2. The method of claim 1, wherein simulating, utilizing the one or more computers, the workforce composition for the organization utilizing the plurality of retention probabilities for at least the time period further comprises:

simulating the workforce composition for the organization utilizing the plurality of retention probabilities for a plurality of time periods.

3. The method of claim 1, further comprising:

optimizing selection of a subset of the specific programs for the organization based at least in part on the calculated retention probabilities.

4. The method of claim 1, further comprising:

identifying for the time period a plurality of job descriptions, wherein each job description includes at least one job requirement; and assigning each employee to a respective job description from the plurality of job descriptions.

5. The method of claim 4, further comprising:

identifying for the time period at least one of the plurality of job descriptions that is not assigned at least one respective employee; and identifying a promotion for at least one of the employees to the at least one not assigned jobs based on at least one attribute value associated with the employee.

6. The method of claim 1, further comprising:

identifying for the time period a recruitment channel to provide at least one potential employee for at least one job description that is not assigned to at least one respective employee; and determining the at least one potential employee to fill the at least one job description that is not assigned to at least one respective employee.

7. The method of claim 1, further comprising:

determining a change in at least one of the retention probabilities based on a change in at least one of the specific programs of the organization.

8. The method of claim 1, wherein identifying the plurality of practices of the organization comprises identifying at least a current specific program or a potential specific program of the organization.

9. The method of claim 1, wherein associating selected attribute values from the one or more employee attribute values of the plurality of employee attributes for each employee of the plurality of employees of the organization comprises associating selected attribute values with a current employee or a potential employee.

10. The method of claim 1, further comprising:

determining one or more changes to the selected attribute values associated with at least one employee of the plurality of employees; and calculating, utilizing the one or more computers, a change in the respective retention probability for the at least one employee based on the one or more determined changes to the selected attribute values associated with the at least one employee.

11. A system for workforce planning for an organization, the system comprising:

one or more non-transitory storage mediums;

an employee attribute module communicatively coupled with a least one of the one or more storage mediums and configured to:

identify a plurality of employee attributes, wherein each employee attribute includes one or more employee attribute values; and associate selected attribute values from the one or more employee attribute values of the plurality of employee attributes with each employee of the plurality of employees of the organization;

an employer practices module communicatively coupled with at least one of the one or more storage mediums and configured to:

identify a plurality of practices of the organization, wherein each practice of the organization includes one or more specific programs;

generate a practice impact matrix comprising a plurality of impact factors, wherein the impact factors of the practice impact matrix represent quantitative measures of impacts of the specific programs of the organization on the employees based the employee attribute values;

a retention probability module communicatively coupled with at least one of the one or more storage mediums and configured to:

calculate a plurality of retention probabilities, wherein each particular retention probability from the plurality of retention probabilities represents a probability that a particular employee from the plurality of employees will remain employed during a time period at the organization based on the impact factors of the practice impact matrix linked with the particular employee based on the selected attribute values associated with the particular employee and each particular retention probability is calculated utilizing an impact calculation that includes a summation of at least one impact factor from the practice impact matrix linked with the particular employee through one of the selected employee attribute values for each of the plurality of practices of the organization and wherein each of the at least one impact factors in the summation is each multiplied by a respective industry-wide impact weight factor linked with the respective practice of the organization; and a simulation module communicatively coupled with at least one of the one or more storage mediums and configured to:

simulate a workforce composition for the organization utilizing the plurality of retention probabilities for at least the time period.

12. The system of claim 11, wherein the simulation module communicatively coupled with at least one of the one or more storage mediums and configured to simulate the workforce composition for the organization utilizing the plurality of retention probabilities for at least the time period is further configured to simulate the workforce composition for the organization utilizing the plurality of retention probabilities for a plurality of time periods.

13. The system of claim 11, further comprising:

an optimization module communicatively coupled with at least one of the one or more storage mediums and configured to optimize selection of a subset of the specific programs for the organization based at least in part on the calculated retention probabilities.

14. The system of claim 11, further comprising:
a workforce requirement module communicatively coupled with at least one of the one or more storage mediums and configured to:
identify for the time period a plurality of job descriptions, wherein each job description includes at least one job requirement; and
assign each employee to a respective job description form the plurality of job descriptions.

15. The system of claim 11, further comprising:
a promotion module communicatively coupled with at least one of the one or more storage mediums and configured to:
identify for the time period at least one of the plurality of job descriptions that is not assigned at least one respective employee; and
identify a promotion for at least one of the employees to the at least one not assigned jobs based on at least one attribute value associated with the employee.

16. The system of claim 11, further comprising:
a recruitment module communicatively coupled with at least one of the one or more storage mediums and configured to:
identify for the time period a recruitment channel to provide at least one potential employee for at least one job description that is not assigned to at least one respective employee; and
determine the at least one potential employee to fill the at least one job description that is not assigned to at least one respective employee.

17. The system of claim 11, wherein the employer practices module configured to identify the plurality of practices of the organization comprises identifying at least a current specific program or a potential specific program of the organization.

18. The system of claim 11, wherein the employee attributes module configured to associate a subset of the plurality of employee attribute values from the one or more employee attribute values with an employee of the organization comprises associating a subset of the plurality of employee attribute values with a current employee or a potential employee.

19. A non-transitory machine-readable storage medium comprising executable instructions for modeling a workforce composition of an organization, the executable instructions comprising code for:
identifying a plurality of employee attributes, wherein each employee attribute includes one or more employee attribute values;
associating selected attribute values from the one or more employee attribute values of the plurality of employee attributes with each employee of a plurality of employees of the organization;
identifying a plurality of practices of the organization, wherein each practice of the organization includes one or more specific programs;
generating a practice impact matrix comprising a plurality of impact factors, wherein the impact factors of the practice impact matrix represent quantitative measures of impacts of the specific programs of the organization on the employees based the employee attribute values; and
calculating a plurality of retention probabilities, wherein each particular retention probability from the plurality of retention probabilities represents a probability that a particular employee from the plurality of employees will remain employed during a time period at the organization based on the impact factors of the practice impact matrix linked with the particular employee based on the selected attribute values associated with the particular employee and each particular retention probability is calculated utilizing an impact calculation that includes a summation of at least one impact factor from the practice impact matrix linked with the particular employee through one of the selected employee attribute values for each of the plurality of practices of the organization and wherein each of the at least one impact factors in the summation is each multiplied by a respective industry-wide impact weight factor linked with the respective practice of the organization; and
simulating the workforce composition for the organization utilizing the plurality of retention probabilities for at least the time period.

20. The machine-readable storage medium of claim 19, wherein the executable instructions comprising code for simulating the workforce composition for the organization utilizing the plurality of retention probabilities for at least the time period further comprises code for:
simulating the workforce composition for the organization utilizing the plurality of retention probabilities for a plurality of time periods.

21. The machine-readable storage medium of claim 19, wherein the executable instructions further comprise code for:
optimizing selection of a subset of the specific programs for the organization based at least in part on the calculated retention probabilities.

* * * * *